(12) United States Patent
Ogawa et al.

(10) Patent No.: US 7,262,688 B2
(45) Date of Patent: Aug. 28, 2007

(54) WHEEL-STATE OBTAINING APPARATUS, AND WHEEL-POSITION-INFORMATION OBTAINING METHOD

(75) Inventors: Atsushi Ogawa, Toyota (JP); Hideki Kusunoki, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 11/005,052

(22) Filed: Dec. 7, 2004

(65) Prior Publication Data

US 2005/0134445 A1    Jun. 23, 2005

(30) Foreign Application Priority Data

Dec. 8, 2003    (JP)    ............................. 2003-408553

(51) Int. Cl.
*B60Q 21/00*    (2006.01)
(52) U.S. Cl. ...................... 340/438; 340/442; 340/447; 73/146.5
(58) Field of Classification Search ................ 340/438, 340/439, 442, 443, 444, 447; 73/146.5
See application file for complete search history.

(56) References Cited

U.S. PATENT DOCUMENTS

| | | | |
|---|---|---|---|
| 5,430,650 A * | 7/1995 | Susuki et al. .................. 701/42 |
| 5,454,762 A * | 10/1995 | Sawase et al. ................. 475/84 |
| 5,599,075 A * | 2/1997 | Hara et al. .................. 303/143 |
| 5,602,524 A | 2/1997 | Mock et al. |
| 5,799,261 A * | 8/1998 | Ozaki et al. .................. 701/78 |
| 6,241,262 B1 * | 6/2001 | Suess ...................... 280/5.522 |
| 6,441,727 B1 | 8/2002 | LeMense |
| 6,948,359 B2 | 9/2005 | Proschka |

FOREIGN PATENT DOCUMENTS

| | | |
|---|---|---|
| DE | 42 05 911 A1 | 9/1993 |
| DE | 102 06 725 A1 | 11/2002 |
| DE | 102 20 083 A1 | 11/2003 |
| DE | 103 17 597 A1 | 11/2004 |
| EP | 0 967 095 A2 | 12/1999 |
| JP | A 11-020428 | 1/1999 |
| JP | B2 3212311 | 7/2001 |
| JP | A 2003-175711 | 6/2003 |

* cited by examiner

*Primary Examiner*—Daryl C Pope
(74) *Attorney, Agent, or Firm*—Oliff & Berridge, PLC

(57) ABSTRACT

A wheel-state obtaining apparatus including wheel-side devices each operable to transmit wheel-side information in response to an abrupt change of a tire air pressure of a corresponding one of wheels, when the tire air pressures of the wheels are abruptly changed in a predetermined order by an operator of the apparatus, and a body-side device operable to receive the wheel-side information from the wheel-side devices in the same order, and obtain wheel-position information indicative of a position of each wheel, on the basis of the predetermined order and a state of reception of the wheel-side information, so that the wheel positions and the wheel-side devices can be automatically correlated with each other, with high accuracy and reliability, by simply changing the tire air pressures of the wheels in the predetermined order.

25 Claims, 11 Drawing Sheets

WHEEL-STATE OBTAINING APPARATUS, AND WHEEL-POSITION-INFORMATION OBTAINING METHOD

The present application is based on Japanese Patent Application No. 2003-408553 filed on Dec. 8, 2003, the contents of which are incorporated herein by reference.

BACKGROUND OF THE INVENTION

1. Field of the Invention

The present invention relates to a wheel-state obtaining apparatus including wheel-side devices and a body-side device that are provided on a vehicle, and a method of obtaining wheel-position information, with such a wheel-state obtaining apparatus.

2. Discussion of Related Art

Examples of such a wheel-state obtaining apparatus are disclosed in JP-3212311B2, JP-2003-175711A and JP-11-20428A. The wheel-state obtaining apparatus disclosed in JP-3212311B2 is arranged such that when an operator of the apparatus enters, into an information processing device of the body-side device, wheel-position information representative of a position of a wheel a tire air pressure of which is to be adjusted, the wheel-side device corresponding to the wheel in question transmits wheel-side information including identification data and air-pressure data, in response to a change in the tire air pressure, and the information processing device stores the identification data and the wheel-position data in relation to each other, when the wheel-side information is received by the information processing device.

The wheel-state obtaining apparatus disclosed in JP-2003-175711A is arranged such that an electric wave transmitted from each of a plurality of wheel-side devices provided for respective wheels of a vehicle is received by a receiver antenna of a body-side device of the vehicle, the body-side device determines the position of the wheel corresponding to the wheel-side device from which the electric wave has been received. The body-side device determines the position of the wheel in question, on the basis of a pattern of periodic change of a voltage of the received electric wave during rotation of the wheel, and stored patterns of periodic change of the voltage of the electric waves transmitted from the respective wheel-side devices.

The wheel-state obtaining apparatus disclosed in JP-11-20428A is arranged to estimate a tire air pressure of a wheel under examination, on the basis of the tire air pressure of a reference wheel, and a ratio of a dynamic load radius of the wheel under examination to that of the reference wheel, and to determine the position of the reference wheel relative to the vehicle body, after a position change of the wheels, on the basis of a state of change of acceleration value of each of the front right and left wheels and rear right and left wheels when teach wheel runs over a raised portion of a roadway surface.

SUMMARY OF THE INVENTION

It is a first object of the present invention to provide an improvement of the wheel-state obtaining apparatus. A second object of the invention is to provide an improvement of the method of obtaining wheel-position information, for example, to improve the accuracy of the wheel-position information obtained, or to simplify an operation to be performed by an operator of the wheel-state obtaining apparatus.

The first object indicated above may be achieved according to a first aspect of this invention, which provides a wheel-state obtaining apparatus comprising (i) a plurality of wheel-side devices which are provided on respective wheels of a vehicle and each of which includes (a) a wheel-state sensor operable to detect a state of a corresponding one of the wheels, and (b) a wheel-side-information transmitting portion operable to transmit, by radio communication, wheel-side information including wheel-state data indicative of the state of the corresponding wheel and identification data identifying each wheel-side device, and (ii) a body-side device provided on a body of the vehicle and including (c) at least one wheel-side-information receiving device operable to receive the wheel-side information transmitted from each of the plurality of wheel-side devices, and (d) an information processing device operable to process the wheel-side information received by the at least one wheel-side-information receiving device, characterized in that the information processing device includes a wheel-position-information obtaining portion operable to obtain wheel-position information indicative of a position of each of the wheels relative to the body of the vehicle, on the basis of a predetermined rule according to which the states of the plurality of wheels are changed.

Each wheel-side includes the wheel-state sensor and the wheel-side-information transmitting portion. The wheel-state sensor may include at least one of an air-pressure sensor operable to detect a tire air pressure of the wheel, a temperature sensor operable to detect a temperature of the air within the wheel tire, and a force sensor operable to detect a force acting on the wheel in a vertical or lateral direction of the vehicle.

The wheel-side-information transmitting portion is arranged to generate and transmit the wheel-side information. The wheel-side information is a series of information formulated in a format suitable for radio transmission, which includes leading data (start data), trailing data (end or stop data), wheel-state data indicative of the state of the wheel detected by the wheel-state sensor, and identification data identifying the wheel-side device, such that the wheel-state data and the identification data are located between the leading data and the trailing data. The wheel-state data include at least one of data indicative of a quantity of the wheel state, and data indicative of a change of the wheel state. Where the wheel-state sensor is an air-pressure sensor operable to detect a tire air pressure of the wheel, for example, the wheel-state data may include at least one of data indicative of a value of the tire air pressure and data indicative of an abrupt change of the tire air pressure, for instance.

The body-side device obtains the state of each wheel, on the basis of the identification data identifying the corresponding wheel-side device and the wheel-state data included in the wheel-side information transmitted from the corresponding wheel-side device, when the body-side device is placed in a wheel-state obtaining mode to obtain the state of the wheel. The body-side device requires the identification data, but may not require the wheel-state data, when the body-side device is placed in a registering mode to initially register the identification data for each wheel-side device and the corresponding wheel-position information, or in a wheel-position obtaining or learning mode to correlate the already registered identification data and the corresponding wheel-position information in relation to each other. Thus, at least one of the wheel-state data and the identification data is used by the body-side device.

According to one preferred form of the wheel-state obtaining apparatus of this invention, the wheel-side-information transmitting portion is operable to transmit the wheel-side information, in response to a change of the state of the corresponding wheel to an extent exceeding a predetermined threshold, and the wheel-position-information obtaining portion is operable to obtain the wheel-position information on the basis of a state of reception of the wheel-side information by the at least one wheel-side-information receiving device, as well as the predetermined rule according to which the states of the plurality of wheels are changed to the above-indicated extent.

The wheel-side information is transmitted from the wheel-side-information transmitting portion of each wheel-side device, in response to or as a result of the change of the wheel state to an extent exceeding the predetermined threshold, when the body-side device is placed in the above-described wheel-position obtaining or learning mode, for instance. In the wheel-state obtaining mode, the wheel-side-information transmitting portion transmits the wheel-side information each time the wheel state is detected by the wheel-state sensor at a predetermined time interval, or alternatively, when the wheel-side device receives from the body-side device a signal requesting the wheel-side device to transmit the wheel-side information.

The change of the wheel state to an extent exceeding the predetermined threshold does not normally take place in the wheel-state obtaining mode, and is used as a trigger signal to activate the wheel-side-information transmitting portion to transmit the wheel-side information. Where the wheel state is the tire air pressure of the wheel, the "change of the state of the corresponding wheel to an extent exceeding a predetermined threshold" is interpreted to mean an abrupt or rapid reduction or increase of the tire air pressure, namely, a change of the tire air pressure at a rate higher than a predetermined threshold, or an amount of change of the tire air pressure more than a predetermined threshold per unit time. Where the wheel state is the temperature of the wheel tire, the change in question is interpreted to mean an abrupt drop or rise of the tire temperature, namely, a change of the tire temperature at a rate higher than a predetermined threshold, or an amount of change of the tire temperature more than a predetermined threshold per unit time.

The state of wheel which is changed to an extent exceeding a predetermined threshold, as a trigger signal to transmit the wheel-side information while the body-side device is placed in the wheel-position obtaining or learning mode may be the state which is detected by the wheel-state sensor and which is indicted by the wheel-state data included in the wheel-side information to be transmitted to the body-side device in the wheel-state obtaining mode. Alternatively, the wheel state which is changed may be a state different from the state indicated by the wheel-state data included in the wheel-state information. For example, the tire air pressure of the wheel is detected and indicated by the wheel-state data included in the wheel-side information, while the tire temperature is changed as a trigger signal to transmit the wheel-side information when the body-side device is in the wheel-position obtaining or learning mode.

The body-side device includes at least one wheel-side-information receiving device operable to receive the wheel-side information from the wheel-side devices, and an information processing device operable to process the wheel-side information received by each wheel-side-information receiving device. Each wheel-side-information receiving device includes an antenna, and the information processing device processes the wheel-side information received by the antenna.

The body-side device may include a plurality of wheel-side-information receiving devices corresponding to the respective wheel-side devices. In this case, the wheel-side device from which the wheel-side information has been received by the wheel-side-information receiving device can be identified on the basis of the wheel-side-information receiving device which has received the wheel-side information. However, the body-side device including the wheel-side-information receiving devices corresponding to the respective wheel-side devices is expensive due to a relatively large number of the wheel-side-information receiving devices.

Alternatively, the body-side device may include a wheel-side-information receiving device which is arranged to receive sets of wheel-side information from the respective two or more wheel-side devices. Namely, a wheel-side-information receiving device may be commonly used for a plurality of wheel-side devices. This arrangement is effective to reduce the cost of manufacture of the body-side device. In this arrangement, however, the wheel-side device from which the wheel-side information has been received by the wheel-side-information receiving device can not be identified on the basis of the wheel-side-information receiving device which has received the wheel-side information. Therefore, it is desirable to register or correlate the identification data identifying the wheel-side devices and the positions of the corresponding wheels, in relation to each other, so that the wheel-side device (wheel) from which the body-side device has received the wheel-side information can be identified on the basis of the identification data included in the received wheel-side information and the registered relation between the identification data and the position of the wheel-side device (wheel). However, the registration of the identification data and the wheel positions in relation to each other is not essential, provided the body-side device can identify the wheel-side device (wheel) from which the wheel-side information has been received by the body-side device (wheel-side-information receiving device).

The states of the plurality of wheels are changed according to the predetermined rule, as trigger signals to activate the wheel-side-information transmitting portion of each wheel-side device to transmit the wheel-side information. Accordingly, the at least one wheel-side-information receiving device of the body-side device should receive the wheel-side information from the wheel-side devices according to the predetermined rule. Where the predetermined rule is known to the body-side device, the wheel-position obtaining portion of the information processing device of the body-side device can obtain the wheel-side information on the basis of the predetermined rule.

The predetermined rule may includes a predetermined order in which the states of the plurality of wheels are changed, or different patterns or modes in which the states of the wheels are changed, respectively, or not only the predetermined order but also the different patterns. The different patterns of change of the wheels states may be predetermined different numbers of change of the states of the respective wheels to an extent exceeding the predetermined threshold within a predetermined time duration, or predetermined different time intervals between adjacent occurrences of such change of the state of each wheel, which intervals correspond to the respective wheels. Thus, the predetermined rule according to which the states of the plurality of wheels are changed involves different moments and/or different patterns or modes of change of the wheel states.

As described above, the wheel-position-information obtaining portion of the body-side device may obtain the wheel-position information on the basis of the state of reception of the wheel-side information by the at least one wheel-side-information receiving device, as well as the predetermined rule according to which the states of the wheels are changed. The state of reception of the wheel-side information may be a moment at which the wheel-side-information receiving device of the body-side device receives the wheel-side information, the number of reception of the wheel-side information from each wheel-side device, or a time interval between the adjacent receptions of the wheel-side information from each wheel-side device.

When the state of each wheel is changed to an extent exceeding a predetermined threshold, as a trigger signal to transmit the wheel-side information, the body-side device should receive the wheel-side information at a moment immediately or a predetermined time after the moment when the trigger signal is generated.

The body-side device may not be able to determine the moment at which the trigger signal is generated, that is, the moment when the state of the wheel is changed to the extent exceeding the predetermined threshold. In this case, the body-side device may estimate this moment, on the basis of the moment when the wheel-side information was received last, the moment when the wheel-position information was obtained last, or the moment when the wheel-position obtaining or learning mode is established.

Where the states of the plurality of wheels are changed in the predetermined order, the body-side device can identify the wheel-side device from which the wheel-side information has been received, on the basis of the order in which the states of the wheels are changed. In other words, the body-side device can determine the wheel-side device from which the wheel-side information should be transmitted next.

Where the states of the plurality of wheels are changed in the respective different patterns or modes, and each wheel-side device transmits the wheel-side information each time the state of the corresponding wheel is changed, the body-side device can determine the position of the wheel on the basis of the number of reception of the wheel-side information from the corresponding wheel-side device. Where the state of the front right wheel is changed twice, and the state of the rear left wheel is changed four times, for example, the body-side device receives the wheel-side information twice from the wheel-side device corresponding to the front right wheel, and the wheel-side information four times from the wheel-side device corresponding to the rear left wheel.

Thus, the wheel-position-information obtaining portion of the body-side device obtains the wheel-position information on the basis of the predetermined rule according to which the states of the plurality of wheels are changed. Since the operator of the wheel-state obtaining apparatus is not required to input the position of each wheel, but the wheel-position-information obtaining portion of the body-side device obtains the wheel-position information, with high accuracy and reliability. Further, the operator is not required to change the state of each wheel and then input the position of that wheel. That is, the operator is simply required to change the states of the wheels according to the predetermined rule, or is not at all required to change the wheel states where the wheel states are automatically changed by a suitable device. In either of these cases, the wheel-side devices and the positions of the corresponding wheels can be efficiently and accurately correlated with each other, after the positions of the wheels relative to the vehicle body are changed due to positional rotation of the wheels, for example.

The body-side device may further include an indicator device operable each time the wheel-position-information obtaining portion has obtained the wheel-position information for each of the plurality of wheels. The indicator device informs that the wheel-position-information obtaining portion has obtained the wheel-position information for each wheel.

The indicator device may be arranged to inform the operator of the wheel-state obtaining apparatus whether the wheel-position-information obtaining portion has obtained the wheel-position information for each wheel, or not. This arrangement facilitates the operator's operation to correlate the identification data of each wheel-side device and the position of the corresponding wheel with each other. However, the indicator device may be arranged to merely inform the operator that the wheel-position-information obtaining portion has obtained the wheel-position information. If the wheel-position information has not been obtained within a predetermined time after the state of the corresponding wheel is changed, the operator can recognize that the wheel-position-information obtaining portion has not obtained the wheel-position information.

The information processing device of the body-side device further may further include (e) a memory portion operable to store the identification data and the wheel-position information of each of the plurality wheels in relation to each other. Once the identification data identifying each wheel has been stored in the memory portion in relation to the corresponding wheel-position information, the position of the wheel corresponding to the wheel-side device from which the wheel-side information has been received can be obtained on the basis of the identification data which are included in the received wheel-side information and which are stored in the memory portion.

The information processing device of the body-side device may include a display operable to provide a view indicating a process of a wheel-position learning operation of the wheel-position-information obtaining portion to obtain the wheel-position information for each of the plurality of wheels.

The display operable to provide a view indicating the process of the wheel-position learning operation to obtain the wheel-position information permits the operator of the apparatus to visually recognize the process in which the wheel-position information is obtained. For example, the display may be arranged to provide a wheel-position learning view showing the vehicle having the plurality of wheels such that each wheel for which the wheel-position information has been obtained, and each wheel for which the wheel-position information has not yet been obtained, are distinguished from each other. For instance, the view includes images of the wheels such that the image of each wheel for which the wheel-position information have been obtained and the image of each wheel for which the wheel-position information has not been obtained are displayed in respective different patterns in the view.

The body-side device may further include a wheel-state changing device operable to change the states of the plurality of wheels according to the predetermined rule. In this case, the states of the wheels are automatically changed according to the predetermined rule, and the operator of the apparatus is not required to manually change the states of the wheels.

Where the predetermined rule of change of the states of the wheels is a predetermined order in which the states of the wheels are changed, the wheel-side-information transmitting portion of each wheel-side device may be arranged to transmit the wheel-side information, in response to a change of the state of the corresponding wheel. In this case, the wheel-position-information obtaining portion is arranged to obtain the wheel-position information on the basis of the predetermined order of change of the wheel states and the order of reception of the wheel-side information by the at least one wheel-side-information receiving device from the plurality of wheel-side devices.

Where the states of the wheels are changed in the predetermined order, the wheel-side devices transmit the wheel-side information in response to the changes of the respective wheel states, in an order corresponding to the predetermined order of changes of the wheel states, so that the at least one wheel-side-information receiving device of the body-side device receives from the wheel-side devices respective sets of wheel-side information, in the order in which the sets of wheel-side information are transmitted from the respective wheel-side devices. Accordingly, the wheel-position-information obtaining device can obtain the wheel-position information on the basis of the predetermined order of change of the wheel states and the order of reception of the sets of wheel-side information from the respective wheel-side devices.

According to another preferred form of the wheel-state obtaining apparatus of this invention, the predetermined rule indicated above is a predetermined order in which the states of the plurality of wheels are changed, and each of the plurality of wheel-side devices further includes a timer operable to measure a time after a moment of termination of a change of the state of the corresponding wheel to an extent exceeding a predetermined threshold within a predetermined time duration, and the wheel-side information further includes elapse time data representative of the time after the above-indicated moment of termination. In this form of the apparatus, the wheel-position-information obtaining portion is operable to obtain the wheel-position information on the basis of the elapse time data, as well as the predetermined order in which the states of the plurality of wheels are changed to the above-indicated extent within the predetermined time duration.

In the preferred form of the apparatus described above, the wheel-position-information obtaining portion is arranged to obtain the wheel-position information for each wheel, on the basis of not only the predetermined order in which the states of the wheels such as the tire air pressures of the wheels are changed to an extent exceeding a predetermined threshold within a predetermined time duration, but also the elapse time data included in the wheel-side information received by the at least one wheel-side-information receiving device.

The timer is arranged to measure the time which has elapsed after the moment of termination of a change of the wheel state to the extent exceeding the predetermined threshold within the predetermined time duration. Namely, the timer is arranged to measure the time after the moment of termination of an abrupt change of the wheel state, that is, a change of the wheel state at a rate higher than a predetermined threshold, or an amount of change more than a predetermined threshold per unit time. Where the wheel state is the tire air pressure, the tire air pressure of each wheel is either reduced or increased, as a trigger signal to activate the wheel-side-information transmitting portion to transmit the wheel-side information.

Where the tire air pressures of the wheels are abruptly changed in the predetermined order, for example, it is generally reasonable to consider that the elapse time data which are included in the wheel-side information received from one of the wheel-side devices and which represent a longer time after the moment of termination of the abrupt change of the tire air pressure of the corresponding wheel than the elapse time data included in the wheel-side information received from the other wheel-side devices indicate that the tire air pressure of the wheel corresponding to the above-indicated one wheel-side device was abruptly changed before the tire air pressures of the other wheels.

Where the sets of wheel-side information of the plurality of wheels are received successively one after another or substantially concurrently received by the body-side device, the times represented by the elapse time data included in the respective sets of wheel-side information received by the body-side device indicate the order of the tire air pressures of the wheels.

However, the body-side device does not necessarily receive the sets of wheel-side information substantially concurrently. Where a time interval between the moments of reception of the two sets of wheel-side information received by the body-side device is relatively long, the elapse time represented by the elapse time data included in the wheel-side information received at a relatively early point of time may be shorter than the elapse time represented by the elapse time data included in the wheel-side information received at a relatively later point of time. Thus, the times represented by the elapse time data do not necessarily represent the order in which the tire air pressures of the wheels in question were actually changed. Namely, the shorter time represented by the elapse time data does not necessarily indicate that the tire air pressure of the wheel corresponding to the wheel-side information including the elapse time data in question was abruptly reduced at the relatively later point of time. In this case it is necessary to correlate the two sets of identification data of the two wheel-side devices with the positions of the corresponding wheels, on the basis of the time interval between the moments of reception of the two sets of wheel-side information, as well as the elapse times represented by the two sets of elapse time data included in the respective sets of wheel-side information. In other words, it is necessary to convert the times represented by the two sets of elapse time data into hypothetical times between the moments at which the tire air pressures of the corresponding two wheels were abruptly reduced and a hypothetical moment at which the corresponding two sets of wheel-side information are substantially concurrently received by the body-side device. The two sets of identification data included in the respective two sets of wheel-side information can be accurately correlated with the positions of the corresponding wheel, on the basis of the thus obtained hypothetical times.

Where each wheel-side device includes the timer described above, the wheel-position-information obtaining portion may include a converter operable when the at least one wheel-side-information receiving device receives from the plurality of wheel-side devices respective sets of wheel-side information at respective different points of times, the converter converting the times represented by sets of elapse time data included in the respective sets of wheel-side information, into hypothetical times between the moments at which the states of the plurality of wheels are changed and a hypothetical moment at which the sets of wheel-side information are substantially concurrently received by the at least one wheel-side-information receiving device. In this case, the wheel-position-information obtaining portion is operable to obtain the wheel-position information on the basis of the hypothetical times, as well as the predetermined order of change of the states of the wheels.

Where each wheel-side device includes the timer described above, the wheel-side-information transmitting portion may include at least one of (i) a first transmitting portion operable to transmit the wheel-side information in response to the change of the state of the corresponding wheel to the above-indicated extent within the predetermined time duration, and at a predetermined time interval thereafter, and (ii) a second transmitting portion operable to transmit the wheel-side information in response to a request signal which is received from the body-side device and which requests the wheel-side-information transmitting portion to transmit the wheel-side information.

When the state of each wheel such as its tire air pressure is abruptly changed, the wheel-position information of this wheel can be obtained on the basis of the wheel-side information transmitted from the corresponding wheel-side device and received by the body-side device, and the predetermined order of change of the states of the wheels, without relying on the time represented by the elapse time data. However, the body-side device may fail to receive the wheel-side information transmitted from the wheel-side device, due to a noise included in the wheel-side information, for example. In this case, the wheel-position information may be obtained on the basis of the elapse time data included in the wheel-side information which is transmitted at the predetermined time interval after the moment of change of the wheel state.

Where the wheel-position information has been obtained for some of the wheels according to the wheel-side information initially transmitted from the first transmitting portion as a result of the abrupt change of the states of those wheels, while the wheel-position information has not been obtained for each of the other of the wheels, the wheel-position information can be obtained on the basis of the elapse time data included in the wheel-side information transmitted at the predetermined time interval from the first transmitting portion of the wheel-side device for which the wheel-position information has already been obtained, and the elapse time data included in the wheel-side information transmitted at the predetermined time interval from the first transmitting portion of the wheel-side devices for which the wheel-position information has not been obtained.

Further, the second transmitting portion of each wheel-side device is operable to transmit the wheel-side information in response to the request signal received from the body-side device. Accordingly, the body-side device can receive, substantially concurrently, the sets of wheel-side information which are transmitted from the second transmitting portion of the two or more wheel-side devices in response to the request signals. The wheel-position-information obtaining portion of the body-side device can obtain the wheel-position information for all of the wheels, on the basis of the times represented by the elapse time data included in the substantially concurrently received sets of wheel-side information.

According to a further preferred form of this invention, wherein said body-side device further includes (e) a wheel-state indicator portion operable to indicate the wheel-state data included in the wheel-side information received by the at least one wheel-side-information receiving portion, (f) an input portion manually operable to input the wheel-position information, (g) a wheel-position-information memory portion for storing the wheel-position information input through the input portion, and (h) a wheel-position-information-memory control portion operable to store the wheel-position information in the wheel-position-information memory portion, wherein the wheel-position-information-memory control portion is operable when the wheel-position information has been input through the input portion after the state of the corresponding wheel indicated by the wheel-state indicator portion is changed, the wheel-position-information-memory control portion storing, in the wheel-position-information memory portion, the identification data identifying the wheel-side device which has transmitted the wheel-side information including the wheel-state data which indicates a change of the state of the corresponding wheel, and the wheel-position information input through the input portion, such that the identification data and the wheel-position information are stored in the wheel-position-information memory portion, in relation to each other.

When the wheel-side information including the wheel-state data and the identification data is transmitted from the wheel-side-information transmitting portion of each wheel-side device, the wheel-state indicator portion of the body-side device indicates the state of the corresponding wheel indicated by the wheel-state data. When the state of the wheel is changed, the state of the wheel indicated by the wheel-state indicator portion is accordingly changed. As previously described, the wheel-state data may be data indicative of a quantity of the wheel state, or data indicative of a change of the wheel state. The operator knows the position of the wheel the state of which has been changed, and therefore recognizes that the wheel at this position corresponds to the wheel-side device which has transmitted the wheel-side information including the wheel-state data indicative of a changed state of the wheel as indicated by the wheel-state indicator portion. The operator who has recognized the changed state of the wheel in question operates an appropriate operator's control member of the input portion, to input or enter the wheel-position information indicative of the position of that wheel relative to the vehicle body.

When the wheel-position information has been input through the input portion of the body-side device after the state of the wheel as indicated by the wheel-state indicator portion is changed, the wheel-position-information-memory control portion is operated to store, in the wheel-position-information memory, the identification data identifying the wheel-side device which has transmitted the wheel-side information including the wheel-state data indicative of a change of the state of the wheel in question, and the wheel-position information which has been input through the input portion, such that the identification data and the wheel-position information are stored in the wheel-position-information memory portion, in relation to each other. The operator can input the wheel-position information with a high degree of accuracy, after the operator has confirmed that the state of the wheel in question as indicated by the wheel-state indicator portion had been changed.

Where the states of the plurality of wheels are changed according to a predetermined rule, as described above, and where the operator knows this predetermined rule, the operator can input the correct wheel-position information through the input portion, on the basis of the state of the wheel in question as indicated by the wheel-state indicator and the predetermined rule according to which the states of the wheels are changed.

As also described previously, the predetermined rule may be a predetermined order in which the states of the plurality of wheels are changed, predetermined numbers of change of the states of the respective wheels, or predetermined time intervals between adjacent occurrences of such change of each wheel, which intervals correspond to the respective wheels. Alternatively, the predetermined rule may be predetermined different amounts or rates of change of the states of the respective wheels.

The input portion may include an operator's control section providing with at least one manually operable member such as pushbuttons or keys, or a manually operable portion of a display having a touch-panel switching function.

Where the operator's control section is provided with pushbuttons or keys corresponding to the respective wheel-side devices, the position of the wheel corresponding to each wheel-side device is designated by pressing the corresponding pushbutton or key an appropriate number of times. Namely, each time the pushbutton or key is pressed, the position of the wheel is changed from one position to the next, and the currently selected position is fixed when the pushbutton or key is kept in the non-pressed state for more than a predetermined first time. When the pushbutton or key is kept in the pressed state for more than a second predetermined time (shorter than the first predetermined time), the currently selected position is cancelled or invalidated.

Alternatively, the input portion may include at least two separate operator's control sections selected from among an operator's control section for changing the selected position of each wheel, an operator's control section for finally designating the currently selected position, and an operator's control section for canceling the currently selected position. Further alternatively, the input portion may include a portion of a display device, which has manually operable areas which correspond to the respective positions (front left, front right, rear left and rear right) of the wheel.

The input portion to input the wheel-position information may be a voice input device arranged to input the wheel-position information with an input of a voice by the operator. In this case, a portion of the voice input device which is responsive to the input voice may be considered an operator's control section.

The wheel-state indicator portion may include a display operable to display the wheel-state data, or a voice output device operable to generate a voice telling the wheel state indicated by the wheel-state data. Alternatively, the wheel-state indicator portion may be lamps or buzzers operable to indicate whether the state of each wheel has changed (to an extent exceeding a predetermined threshold).

Where the wheel-state indicator portion includes a display, the display may include a plurality of display portions which correspond to the respective wheel-side devices (respective sets of identification data) and each of which includes two sections for indicating the state and position of the corresponding wheel, respectively. The two sections of each display portion of the display may be arranged to provide an image indicative of the state of the wheel and an image indicative of the position of the wheel. The section for indicating the position of the wheel is blank before the wheel-position information is input through the input portion, and provides an image indicative of the position of the wheel represented by the wheel-position information after the wheel-position information is input. The operator operates the input portion to input the wheel-position information while observing a change of the wheel state as indicated in the section for indicating the state of the wheel.

The body-side device includes a wheel-state-change detecting portion operable to detect a change of the state of each wheel indicated by the wheel-state data included in the wheel-side information received from the corresponding wheel-side device.

The wheel-state indicator portion may be arranged to indicate the wheel state when the wheel-state-change detecting portion has detected a change of the wheel state, and not to indicate the wheel state before the wheel-state-change detecting portion has detected a change of the wheel state. Alternatively, the wheel-state indicator portion may be arranged to indicate the wheel state in one manner before the wheel-state-change detecting portion has detected a change of the wheel state, and in another manner after the detecting portion has detected a change of the wheel state. The body-side device may be arranged to determine whether the input portion has been operated to input the wheel-position information, only when the wheel-state-change detecting portion has detected a change of the wheel state, and not to effect this determination before the detecting portion has detected the change. This arrangement assures an increased degree of accuracy of operation of the input portion by the operator.

According to a still further preferred form of the apparatus of this invention, the wheel-position-information obtaining portion is operable to obtain the wheel-position information of each of the plurality of wheels, on the basis of the wheel-state data included in the wheel-side information received by the at least one wheel-side-information receiving device, as well as the predetermined rule according to which the states of said plurality of wheels are changed.

In the preferred form of the wheel-state obtaining apparatus according to the above-described preferred form of the invention, the wheel-position obtaining portion is arranged to obtain the wheel-state information of each wheel on the basis of not only the predetermined rule of change of the states of the wheels, but also the wheel-state data included in the received wheel-side information. Accordingly, the operator is not required to effect an operation to input the wheel-position information.

When the states of the wheels are changed according to the predetermined rule, the changed state of each wheels are detected by the wheel-state sensor of the corresponding wheel-side device, and the wheel-side information including the wheel-state data indicative of the detected state of the wheel is transmitted. On the basis of the wheel-state data included in the wheel-side information received from the wheel-side device, the wheel-position obtaining portion of the body-side device obtains the state of the wheel on the basis of the wheel-side data included in the received wheel-side information. Accordingly, the wheel-position obtaining portion can obtain the wheel-position information on the basis of the wheel-sate data and the predetermined rule, provided the predetermined rule is known to the wheel-position obtaining portion.

As previously described, the predetermined rule may be a predetermined order of change of the wheel states, or predetermined different numbers, time intervals, amounts or rates of changes of the wheel states, which correspond to the respective wheels.

According to a yet further preferred form of the apparatus of this invention, the plurality of wheel-side devices consist of a plurality of first wheel-side devices provided on respective installed wheels installed on the body, and at least one second wheel-side device provided on at least one spare wheel, and the body-side device further includes an identification-data memory portion for storing the identification data identifying each of the plurality of wheel-side devices, the wheel-position obtaining portion including an identification-data specifying portion operable to specify, on the basis of the wheel-side information received by the at least one wheel-side-information receiving device, the identification data identifying the wheel-side device provided on each of the above-indicated at least one spare wheel, when the states of the installed wheels are changed according to the predetermined rule while the state of the at least one spare wheel is kept unchanged, after the positions of at least two of the plurality of wheels consisting of the installed wheels and the at least one spare wheel are changed for positional rotation of the plurality of wheels.

Where the wheel-side-information transmitting portion is arranged to transmit the wheel-side information in response to an abrupt change of the state (e.g., tire air pressure) of the corresponding wheel, the wheel-side-information transmitting portion of the wheel-side device provided on each installed wheel transmits the wheel-side information, but the wheel-side-information transmitting portion of the wheel-side device provided on each spare wheel does not transmit the wheel-side information. Accordingly, the identification-data specifying portion can determine, as the identification data identifying the wheel-side device corresponding to each spare wheel, the identification data which are not included in any one of sets of the wheel-side information which have been received from the wheel-side devices.

Where the wheel-side-information transmitting portion is arranged to transmit the wheel-side information irrespective of an abrupt change of the state of the corresponding wheel, the identification-data specifying portion can specify the identification data identifying the wheel-side device corresponding to each spare wheel, on the basis of the wheel-state data included in the received sets of the wheel-side information. Namely, where the wheel-state data included in the received set of wheel-side information do not indicate a change of the wheel state, the identification data included in that wheel-side information identifies the spare wheel. Where the states of the installed wheels are abruptly changed according to the predetermined rule, the body-side device can correlate the identification data of each wheel with the position of the wheel in question, on the basis of the wheel-state data (indicative of a tire air pressure, for example) and the predetermined rule.

The first object previously described may also be achieved according to a second aspect of the present invention, which provides a wheel-state obtaining apparatus comprising (i) a plurality of wheel-side devices which are provided on respective wheels of a vehicle and each of which includes (a) a wheel-state sensor operable to detect a state of a corresponding one of the wheels, and (b) a wheel-side-information transmitting portion operable to transmit, by radio communication, wheel-side information including wheel-state data indicative of the state of the corresponding wheel and identification data identifying each wheel-side device, and (ii) a body-side device provided on a body of the vehicle and including (c) at least one wheel-side-information receiving device operable to receive the wheel-side information transmitted from each of the plurality of wheel-side devices, (d) an information processing device operable to process the wheel-side information received by the at least one wheel-side-information receiving device, (e) a wheel-state indicator portion operable to indicate the wheel-state data included in the wheel-side information received by the at least one wheel-side-information receiving portion, (f) an input portion manually operable to input wheel-position information indicative of a position of each of the wheels relative to the body, (g) a wheel-position-information memory portion for storing the wheel-position information input through the input portion, and (h) a wheel-position-information-memory control portion operable to store the wheel-position information in the wheel-position-information memory portion, wherein an improvement comprises:

the wheel-position-information-memory control portion being operable when the wheel-position information has been input through the input portion after the state of the corresponding wheel indicated by the wheel-state indicator portion is changed, the wheel-position-information-memory control portion storing, in the wheel-position-information memory portion, the identification data identifying the wheel-side device which has transmitted the wheel-side information including the wheel-state data which indicates a change of the state of the corresponding wheel, and the wheel-position information input through the input portion, such that the identification data and the wheel-position information are stored in the wheel-position-information memory portion, in relation to each other.

The second object previously described may be achieved according to a third aspect of this invention, which provides a method of obtaining wheel-position information indicative of a position of each of a plurality of wheels of a vehicle relative to a body of the vehicle, with a wheel-state obtaining apparatus comprising (i) a plurality of wheel-side devices which are provided on the plurality of wheels, respectively and each of which includes (a) a wheel-state sensor operable to detect a first state of a corresponding one of the wheels, and (b) a wheel-side-information transmitting portion operable to transmit, by radio communication, wheel-side information including at least one of first-wheel-state data indicative of the first state of the corresponding wheel and identification data identifying each wheel-side device, in response to a change of a second state of the corresponding wheel to an extent exceeding a predetermined threshold, and (ii) a body-side device provided on the body of the vehicle and including (c) at least one wheel-side-information receiving device operable to receive the wheel-side information transmitted from each of the plurality of wheel-side devices, and (d) an information processing device operable to process the wheel-side information received by said at least one wheel-side-information receiving device, said method comprising:

changing the second states of the plurality of wheels to the above-indicated extent according to a predetermined rule, and obtaining the wheel-position information of each of the plurality of wheels, on the basis of the predetermined rule and a state of reception by the at least one wheel-side-information receiving device of the wheel-side information transmitted from a corresponding one of the plurality of wheel-side devices.

According to one preferred form of the method of the invention, the second states of the plurality of wheels are changed to the above-indicated extent in a predetermined order, and the wheel-side information of each of the plurality of wheels is obtained on the basis of the predetermined order and an order in which sets of the wheel-side information transmitted from the plurality of wheel-side devices, respectively, have been actually received by the at least one wheel-side-information receiving device.

According to one advantageous arrangement of the preferred form of the method described above, each of the plurality of wheel-side devices further includes a timer operable to measure a time after a moment of termination of a change of the second state of the corresponding wheel to the above-indicated within a predetermined time duration, and the wheel-side information further includes elapse time data representative of said time after the above-indicated moment of termination, and wherein the wheel-position information is obtained on the basis of the elapse time data, as well as the above-indicated predetermined order of change of the seconds states of the wheels.

The second object may also be achieved according to a fourth aspect of this invention, which provides a method of obtaining wheel-position information indicative of a position of each of a plurality of wheels of a vehicle relative to a body of the vehicle, with a wheel-state obtaining apparatus comprising (i) a plurality of wheel-side devices which are provided on the plurality of wheels, respectively and each of which includes (a) a wheel-state sensor operable to detect a state of a corresponding one of the wheels, and (b) a wheel-side-information transmitting portion operable to transmit, by radio communication, wheel-side information including wheel-state data indicative of the state of the corresponding wheel and identification data identifying each wheel-side device, and (ii) a body-side device provided on the body of the vehicle and including (c) at least one wheel-side-information receiving device operable to receive the wheel-side information transmitted from each of the plurality of wheel-side devices, (d) an information processing device operable to process the wheel-side information received by the at least one wheel-side-information receiving device, (e) a wheel-state indicator portion operable to indicate the wheel-state data included in the wheel-side information received by the at least one wheel-side-information receiving portion, (f) an input portion manually operable to input wheel-position information indicative of a position of each of the wheels relative to the body, (g) a wheel-position-information memory portion for storing the wheel-position information input through the input portion, and (h) a wheel-position-information-memory control portion operable to store the wheel-position information in the wheel-position-information memory portion, the method comprising:

sequentially changing the states of the plurality of wheels each of which is detected by the wheel-state sensor;

inputting the wheel-position information through the input portion after confirming that the state of each wheel indicated by the wheel-state indicator portion has been changed; and storing, in the wheel-position-information memory portion, the identification data identifying the wheel-side device which has transmitted the wheel-side information including the wheel-state data which indicates a change of the state of the corresponding wheel, and the wheel-position information input through the input portion, such that the identification data and the wheel-position information are stored in the wheel-position-information memory portion, in relation to each other.

In the wheel-position obtaining method according to the fourth aspect of this invention described above, the operator is not required to input the wheel-position information through the input portion and then change the state of each wheel. Instead, the operator first changes the state of the wheel in question, and observes a change of the state of the wheel indicated by the wheel-state indicator portion according to the wheel-state data included in the wheel-side information received from the corresponding wheel-side device. The operator then inputs the wheel-position information corresponding to the wheel-side device from which the body-side device has received the wheel-side information including the wheel-state data which indicates a change of the wheel state. Since the wheel-position information is input through the input portion only after confirming the change of the wheel in question, the wheel-position information can be correlated with the corresponding identification data, with a high degree of accuracy and reliability.

While the various technical features of the present invention have been described above, the principle of the present invention provides each of these features alone, or in combination with one or more of the other features.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENT

Figure 1:
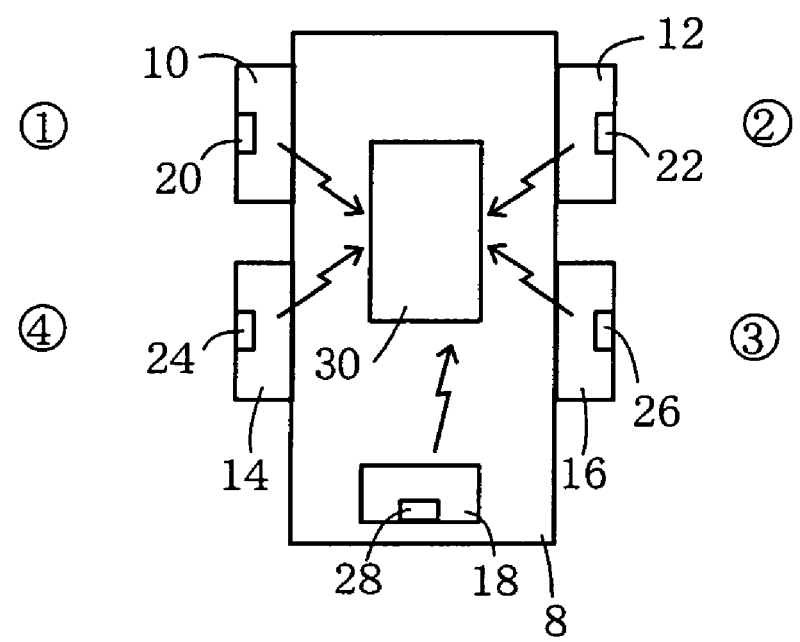
FIG. 1 is a view schematically showing an overall arrangement of a wheel-state obtaining apparatus constructed according to a first embodiment of this invention.

Referring first to FIG. 1, there will be described a wheel-state obtaining apparatus constructed according to the first embodiment of this invention. As shown in FIG. 1, a body 8 of a motor vehicle is provided with a front left wheel 10, a front right wheel 12, a rear left wheel 14 and a rear right wheel 16, which are installed at respective positions relative to the vehicle body 8. The vehicle body 8 is further provided with a non-installed, spare wheel 18 accommodated in a rear luggage compartment, for example. The spare wheel 18 may be fixed on a floor or back panel of the vehicle body 8. Each of the wheels 10–18 includes a wheel portion and a rubber tire. The wheels 10–18 are provided with respective wheel-side devices 20, 22, 24, 26 and 28, while the vehicle body 8 is provided with a body-side device 30.

Figures 2, 3:
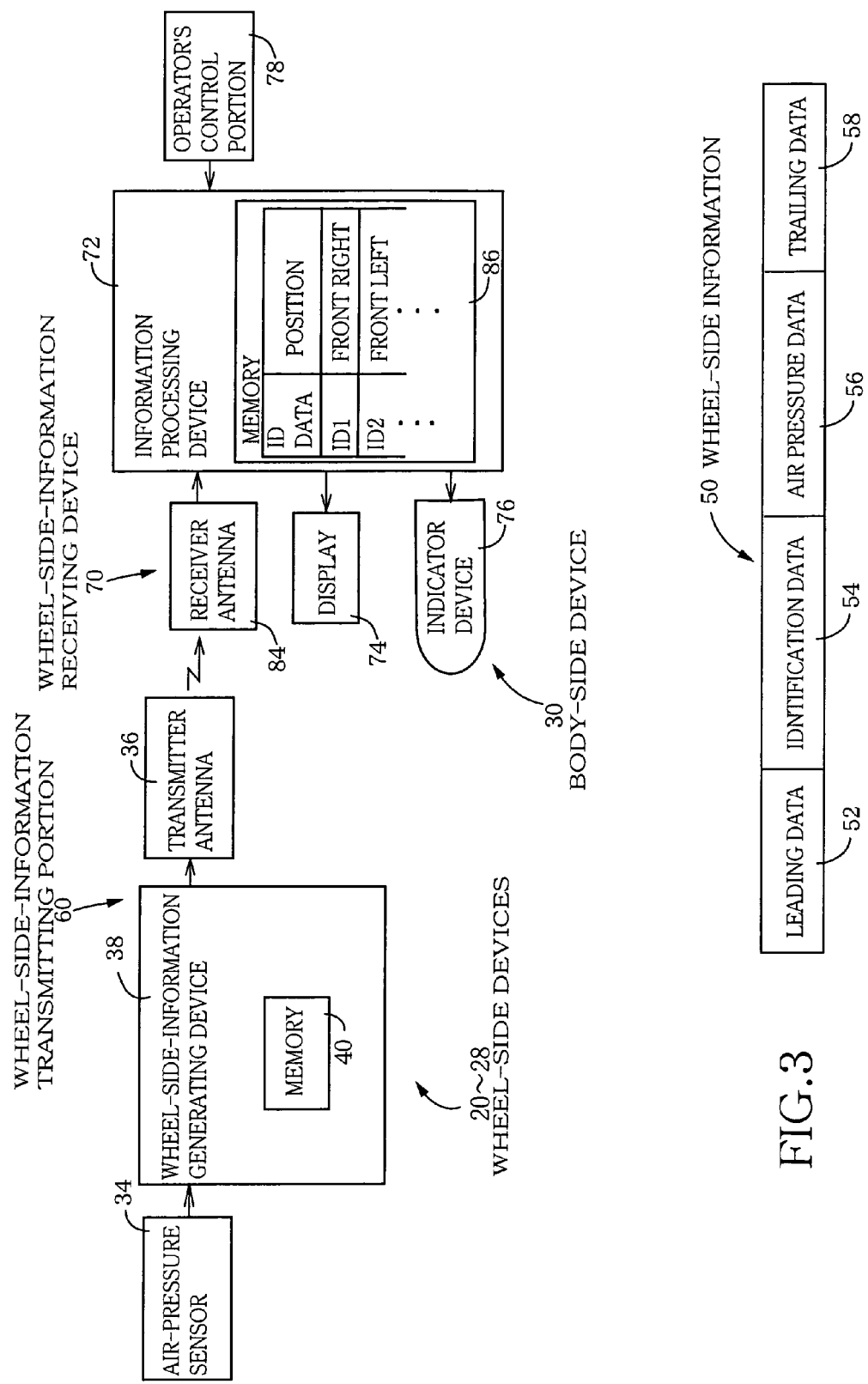
FIG. 2 is a block diagram schematically showing wheel-side devices and a body-side device of the wheel-state obtaining apparatus of FIG. 1.
FIG. 3 is a view schematically showing wheel-side information transmitted from each wheel-side device of FIG. 2.

As shown in FIG. 2, each of the wheel-side devices 20–28 includes an air-pressure sensor 34 arranged to detect an air pressure of the tire of the corresponding wheel 10–18, a transmitter antenna 36, and a wheel-side-information generating device 38 operable to generate a series of wheel-side information which includes air pressure data representative of the tire air pressure detected by the air-pressure sensor 34. The wheel-side-information generating device 38 includes a computer having an input/output portion connected to the air-pressure sensor 34 and the transmitter antenna 36. The wheel-side-information generating device 38 further includes a memory 40, which stores sets of identification data identifying the respective wheel-side devices 20–28.

In each of the wheel-side devices 20–28, the tire air pressure of the corresponding wheel 10–18 is detected by the air-pressure sensor 34, and the series of wheel-side information is generated by the wheel-side-information generating device 38. As described above, the series of wheel-side information includes the above-indicated tire air pressure representative of the detected tire air pressure. Described in detail, the series of wheel-side information indicated at 50 in FIG. 3 is a batch of information for radio transmission, which includes leading data 52, identification data (ID data) stored in the memory 40, wheel-state data in the form of air pressure data 56 representative of the detected tire air pressure, and trailing data 58. The leading data include a synchronization signal, and the trailing data include a check signal. The air pressure data may be data representative of a value of the detected tire air pressure of the wheel in question, data representative an abrupt or rapid change of the tire air pressure, or data representative of both the detected tire air pressure value and the abrupt change of that value.

Normally, the air pressure sensor 34 detects the tire air pressure at a predetermined time interval, and the wheel-side-information generating device 38 generates and transmit the series of wheel-side information 50 each time the tire air pressure is detected.

When the detected tire air pressure abruptly or rapidly changes, the wheel-side information is immediately generated and transmitted. In other words, the wheel-side information 50 is transmitted through the transmitter antenna 36, in response to an abrupt change of the detected tire air pressure, namely, to a change of the detected tire air pressure to an extent exceeding a predetermined threshold, for example, a change of the detected tire air pressure at a rate higher than a predetermined threshold, or an amount of change of the detected tire air pressure more than a predetermined threshold per unit time. In this case, the tire air pressure displayed in a wheel-position learning mode of the body-side device 30 is accordingly changed. In the present embodiment, a wheel-side-information transmitting portion 60 is principally constituted by the wheel-side-information generating device 38 and the transmitter antenna 36.

The body-side device 30 includes a wheel-side-information receiving device 70, an information processing device 72 principally constituted by a computer and operable to process the received wheel-side information 50, a display 74, an indicator device 76, and an operator's control portion 78 manually operable by an operator of the wheel-state obtaining apparatus.

The wheel-side-information receiving device 70 includes a single receiver antenna 84 used commonly for all of the five wheel-side devices 20–28, in the present embodiment. However, the wheel-side-information receiving device 70 may include two or three receiver antennas (a plurality of receiver antennas the number of which is smaller than the number of the wheels 10–18 the position data of which are processed by the information processing device 72).

The information processing device 72 is arranged to process the wheel-side information 50 received through the wheel-side-information receiving device 70. The information processing device 72 includes a memory 86, which stores the identification data 54 included in the wheel-side information 50 received from each wheel-side device 20–28. In the present embodiment, the identification data 54 corresponding to the respective wheels 10–18 are stored in the memory 86, in relation to the positions of those wheels 10–18 relative to the vehicle body 8. The memory 86 further stores various control programs such as a wheel-position learning program illustrated in the flow chart of FIG. 5, and a predetermined control rule.

The display 74 is located at a suitable position within a vehicle operator's compartment of the vehicle body 8, for example, incorporated within an instrument panel within the compartment. The display 74 is arranged to display the contents of the air pressure data 56 received from the wheel-side devices 20–28, and indicate the identification data 54 in relation to the positions of the wheels 10–18.

The operator's control portion 78 is operable by the vehicle operator, for example, to input the wheel positions in a wheel-position registering mode, to obtain the air pressure data 57 in a wheel-state obtaining mode, and to select an abrupt reduction or an abrupt increase of the tire air pressure in the above-indicated wheel-position learning mode. The operator's control panel 78 may utilize a portion of the display 74 which has a touch-panel function, or may be provided separately from the display 74.

When the wheels are newly installed on the vehicle body 8 in a plant to manufacture the vehicle, the body-side device 30 is placed in the wheel-position registering mode, to register the identification data for each installed wheel and the corresponding position of the wheel, in relation to each other. The body-side device 30 is placed in the wheel-state obtaining mode, to obtain the air pressure data 56 included in the wheel-side information 50 received from the wheel-side devices 20–28. In this wheel-state obtaining mode, the tire air pressure data 56 are displayed on the display 74. When the positions of the wheels 10–18 have been changed or rotated or when any of the wheels 10–18 has been replaced with another wheel, the body-side device 30 is placed in the wheel-position learning mode. In this wheel-position learning mode, the identification data stored in the memory 86 for each of the wheels 10–18 are re-registered in relation to the position of the wheel, in a wheel-position learning fashion.

The indicator device 76 is provided to inform the operator of the apparatus of a state of learning of the wheel-position information in the wheel-position learning mode. Preferably, the indicator device 76 is operable to be able to inform the operator who is located outside the vehicle. The indicator device 76 may include a visual indicator that permits the operator of the apparatus to observe the state of learning of the wheel positions by the sense of vision, an audio indicator that permits the operator to recognize the state of learning by the sense of hearing, or any other type of indicator that permits the operator to recognize the state of learning by the other senses of the operator. The visual indicator may be arranged to emit a light that can be recognized by the sense of vision of the operator outside the vehicle, and the audio indicator may be arranged to generate a sound that can be recognized by the sense of hearing of the operator. The other type of indicator may be a cellular or portable phone which is carried by the operator and which is arranged to be vibrated or provide a visible display.

In the present embodiment, the indicator device 76 is separate from the display 74 disposed within the vehicle operator's compartment of the vehicle. The indicator device 76 may be exclusively for the wheel-state obtaining apparatus, or may utilize a sound or voice generating device of an audio or navigation system disposed within the vehicle body 8.

The indicator device 76 may utilize a light emitter disposed on the front side of the vehicle body 8, such as head lights, fog lamp and front turn signal lights, or a light emitter disposed on the rear side of the vehicle body 8, such as stop/tail lights, rear turn signal lights, a backup light, and a high-mount stop light. Alternatively, the indicator device 76 may utilize a horn or a buzzer, or may be arranged to transmit a signal to a key device for the vehicle, a cellular phone or any other portable device which is often carried by the operator of the vehicle or the operator of the wheel-state obtaining apparatus.

Each wheel-side device 20–28 may include, in addition to or in place of the air-pressure sensor 34, a temperature sensor arranged to detect the temperature within the corresponding wheel tire, and/or a force sensor arranged to detect a force acting on the wheel tire.

Figure 4:
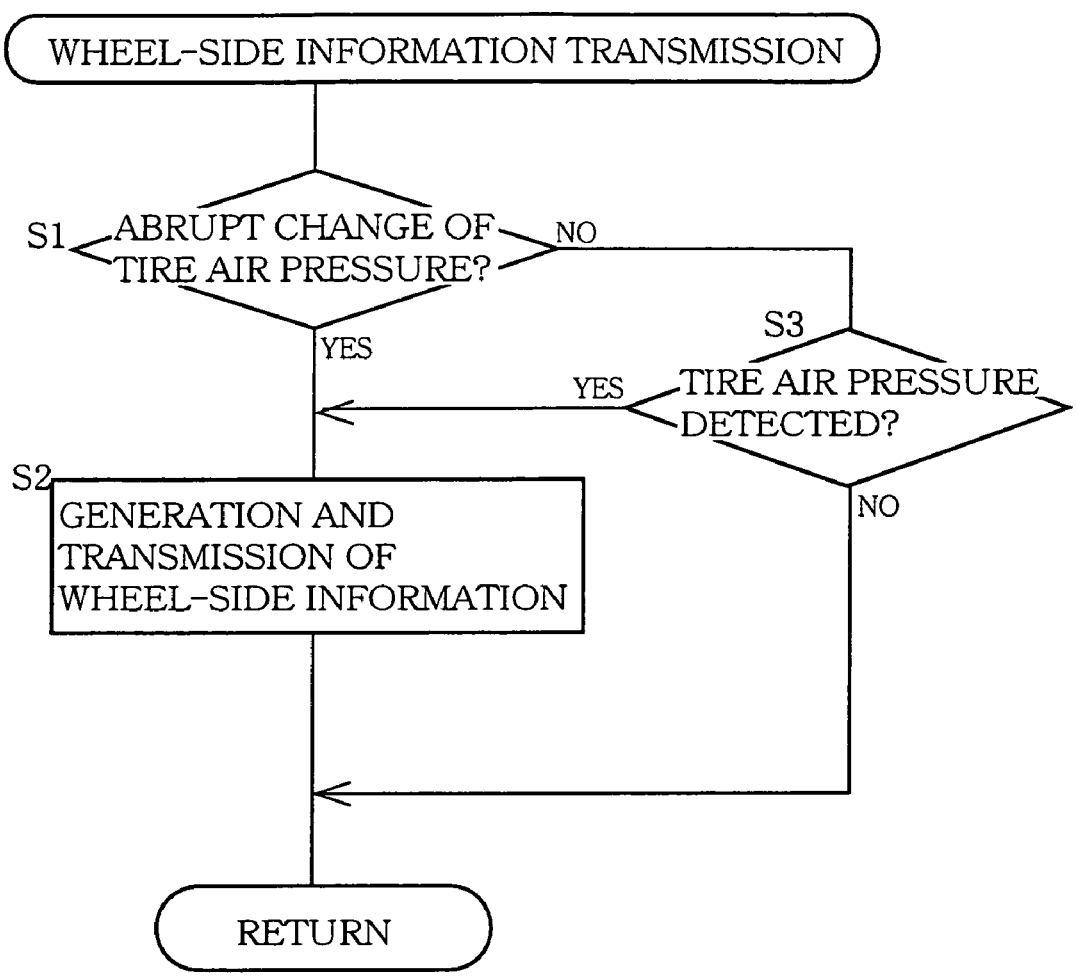
FIG. 4 is a flow chart illustrating a wheel-side-information transmitting program stored in a memory portion of a wheel-side-information generating device of each wheel-side device.

There will be described an operation of the wheel-state obtaining apparatus constructed as described above. Each of the wheel-side devices 20–28 executes a wheel-side-information transmitting program illustrated in the flow chart of FIG. 4, with a predetermined cycle time. This program is initiated with step S1 to determine whether an abrupt or rapid change of the tire air pressure has taken place. If an affirmative decision (YES) is obtained in step S1, the control flow goes to step S2 in which the series of wheel-side information 50 including the air pressure data 56 is generated by the wheel-side-information generating device 38 and transmitted from the transmitter antenna 36. If a negative decision(NO) is obtained in step S1, the control flow goes to step S3 to determine whether the tire air pressure has been regularly detected by the air-pressure sensor 34. If an affirmative decision (YES) is obtained in step S3, the control flow goes to step S2 in which the wheel-side information 50 is generated and transmitted.

When the body-side device 30 is placed in the wheel-state obtaining mode, the information processing device 72 obtains the air pressure data 56 included in the wheel-side information 50 transmitted from each of the wheel-side devices 20–28 and received through the wheel-side-information receiving device 70, and the contents of the air pressure data 56 are indicated on the display 74.

Figure 6:
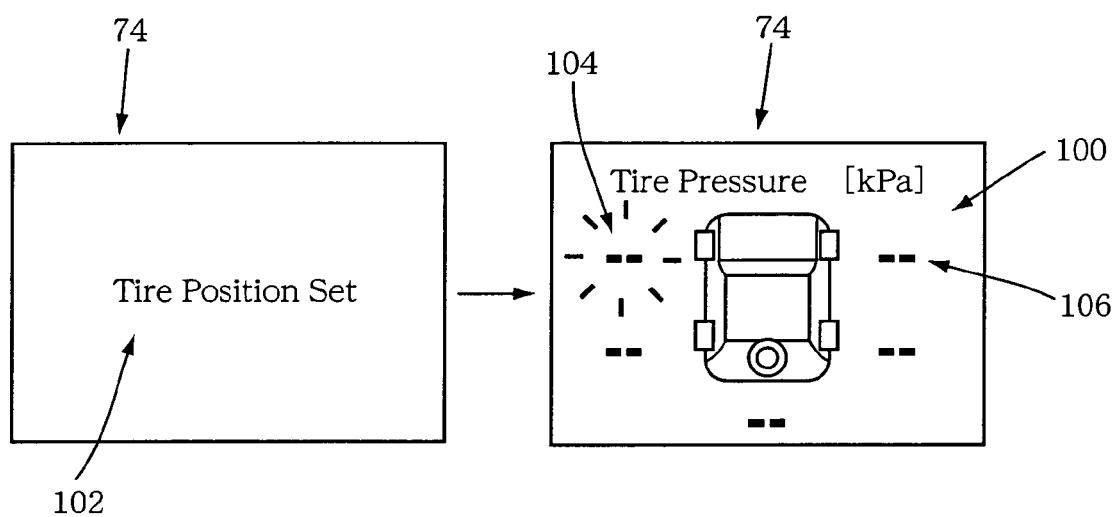
FIGS. 6 is a view schematically showing contents of a display of the information processing device of the body-side device.

When the body-side device 30 is placed in the wheel-position learning mode by an operation of the operator's control portion 78 by the operator of the apparatus, a wheel-position learning view 100 appears on the display 74, as indicated in FIG. 6. For example, the wheel-position learning mode is established by holding a Tire Position Set switch on the operator's control portion 78 in its operated position for more than a predetermined length of time, while a view 102 including a message "Tire Position Set" appears on the display 74. In this mode, an abrupt reduction or increase of the tire air pressure is selected through the operator's control portion 78.

In the present embodiment, the tire air pressures of the four wheels 10–16 are changed by the operator of the wheel-state obtaining apparatus, according to a predetermined rule stored in the memory 86. For example, the tire air pressures of the wheels 10–16 are abruptly reduced in the order of the front left wheel 10, front right wheel 12, rear right wheel 16 and rear left wheel 14, as indicated in FIG. 1. In this case, the tire air pressure of the spare wheel 18 is not abruptly reduced.

As a result of the sequential abrupt reductions of the tire air pressures indicated above, the wheel-side information 50 is transmitted from each of the wheel-side devices 20–26, in the order of the wheel-side device 20 for the front left wheel 10, the wheel-side device 22 for the front right wheel 12, the wheel-side device 26 for the rear right wheel 16, and the wheel-side device 24 for the rear left wheel 14. Accordingly, the body-side device 30 receives the wheel-side information 50 from the wheel-side devices 20, 22, 26, 24, in the order of transmission of the wheel-side information 50.

The abrupt reduction of the tire air pressure of each wheel 10–16 is made by the operator. For instance, the tire air pressure can be abruptly reduced by holding a valve core of the tire in a depressed state for a predetermined time (e.g., about one minute). Thus, the information processing device 72 learns the positions of the wheels 10–16 on the basis of the wheel-side information 50 transmitted from each of the corresponding wheel-side devices 20–26 in response to the abrupt reduction of the tire air pressures. Each time the learning of the position of each wheel is completed, the operator outside the vehicle is informed of this fact, by the indicator device 76.

Figure 5:
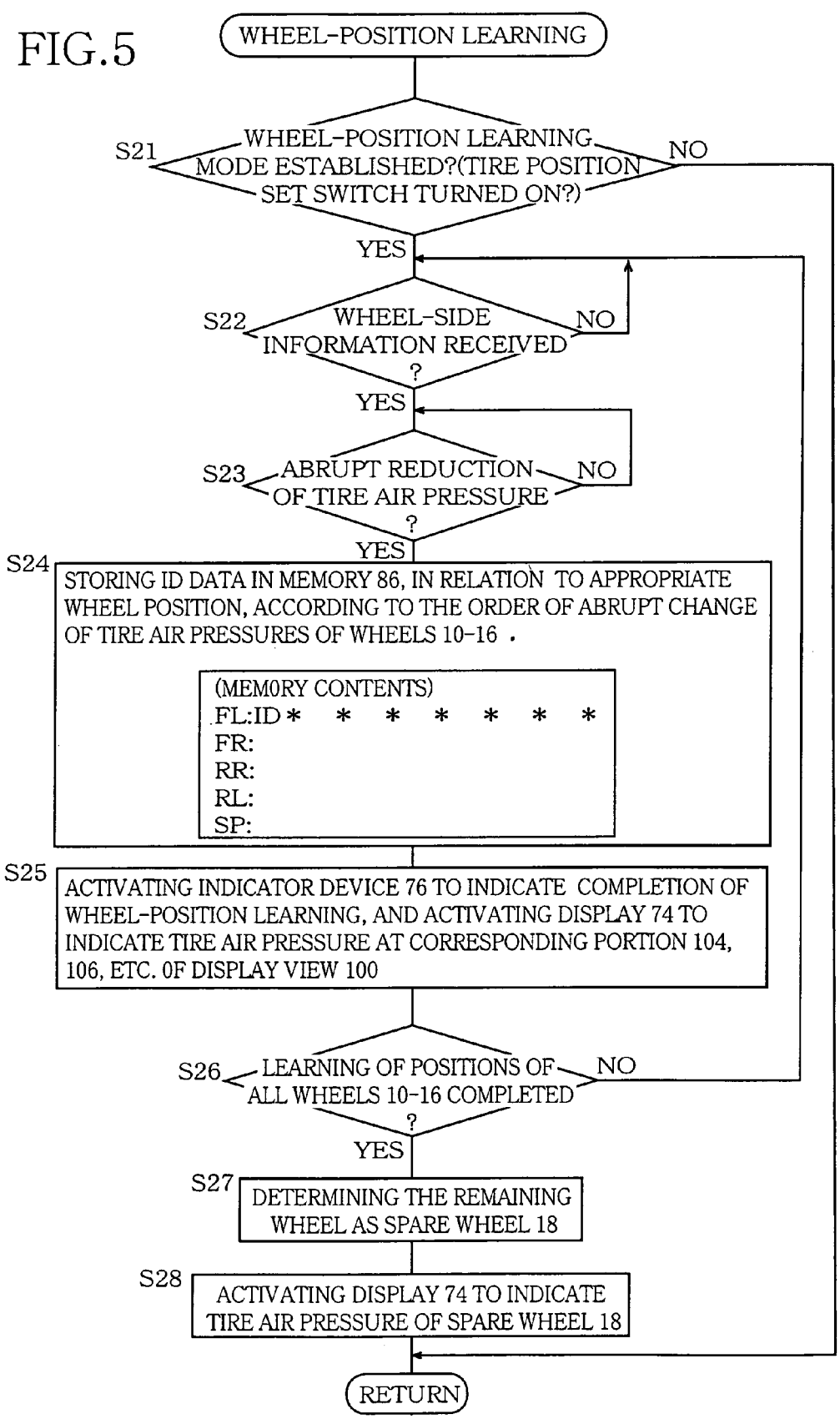
FIG. 5 is a flow chart illustrating a wheel-position learning program stored in a memory portion of an information processing device of the body-side device of FIG. 2.

There will be described the learning of the wheel positions after the positional rotation of the wheels 10–18, by reference to the flow chart of FIG. 5 illustrating a wheel-position learning program. This program is initiated with step S21 to determine whether the body-side device 30 is placed in the wheel-position learning mode (whether the learning of the wheel positions has been required with the Tire Position Set switch turned on). If an affirmative decision (YES) is obtained in step S21, the control flow goes to step S22 to determine whether the wheel-side information transmitted from any wheel-side device has been received by the wheel-side-information receiving device 70. If an affirmative decision (YES) is obtained in step S22, the control flow goes to step S23 to determine whether the air pressure data 56 included in the received wheel-side information 50 indicate an abrupt change of the tire air pressure. The wheel-side information 50 transmitted in response to an abrupt change of the tire air pressure can be distinguished from the wheel-side information 50 which is regularly transmitted from each of the wheel-side devices 20–28 at a predetermined time interval.

Since the wheel-side information 50 is initially transmitted from the wheel-side device 20 for the front left wheel 10 in the wheel-position learning mode, as described above, it is considered that the initially received wheel-side information 50 including the air pressure data 56 indicating an abrupt change of the tire air pressure has been transmitted from the wheel-side device 20. In step S24 following the affirmative decision (YES) in step S23, the identification data 54 included in the initially received wheel-side information 50 are stored in the memory 86, in relation to the front left (FL) position of the vehicle body 8.

Step S24 is followed by step S25 in which the indicator device 76 is activated to inform the operator outside the vehicle that the learning of the position of the front left wheel 10 is completed. Thus, the operator who has effected the abrupt reduction of the tire air pressure of the front left wheel 10 is informed that the apparatus is now ready to learn the position of the next wheel, namely, the front right wheel 12. At the same time, the display 74 is activated to indicate the tire air pressure at a portion 104 of the wheel-position learning view 100, which corresponds to the front left position (FL). Thus, the operator is informed also by the display 74, of the fact that the learning of the position of the front left wheel 10 is completed.

Step S25 is followed by step S26 to determine whether the learning of the positions of all of the four wheels 10–16 (all wheels 10–18 except the spare wheel 18) is completed. If a negative decision (NO) is obtained in step S26, that is, if the learning of the positions of the four wheels 10–16 (wheel-side devices 20–26) is not completed, the control flow goes back to step S22.

When the next wheel-side information 50 including the air pressure data 56 indicating an abrupt change of the tire air pressure has been received, it is considered that this wheel-side information 50 has been transmitted from the wheel-side device 22 for the front right wheel 12. In this case, the affirmative decision is obtained in step S23, which is followed by step S24 in which the identification data 54 included in the wheel-side information 50 in question are stored in the memory 86, in relation to the front right position (FR) of the vehicle body 8. Step S24 is followed by step S25 in which the indicator device 76 is activated to inform the operator that the leaning of the position of the front right wheel 12 is completed, and the display 74 is activated to indicate the tire air pressure of the front right wheel 12 at a portion 106 of the wheel-position learning view 100, which corresponds to the front right position (FR).

Steps S22–S26 are subsequently repeated to effect the learning of the positions of the rear left wheel 16 and the rear right wheel 18, so that the learning of the positions of all of the four wheels 10–16 (all of the wheels 10–18 except the spare wheel 18) is completed. As a result, an affirmative decision (YES) is obtained in step S26, and the control flow goes to step S27 in which the identification data which is stored in the memory 86 and which has not yet been correlated with any wheel position are determined as the identification data 54 identifying the remaining wheel, that is, the spare wheel 18. Step S27 is followed by step S28 in which the air pressure data 56 included in the wheel-side information 50 received from the wheel-side device 28 for the spare wheel 18 are obtained, and the tire air pressure represented by the obtained air pressure data 56 is indicated on the display 74, so that the operator is informed that the learning of the positions of all of the five wheels 10–18 is completed. Then the operator adjusts the tire air pressures of the wheels 10–18 back to the optimum value.

As described above, the wheel-state obtaining apparatus according to the present embodiment of the invention is arranged such that the predetermined rule according to which the tire air pressures of the wheels 10–16 are abruptly changed by the operator of the apparatus in the wheel-position learning mode is stored in the body-side device 30. Described more precisely, data representative of the order in which the tire air pressures of the four wheels 10–16 are abruptly changed by the operator after the positional rotation of the wheels 10–18 are stored in the memory 86 of the information processing device 72, so that the information processing device 72 can determine the order in which the wheel-side information 50 is received as a result of the abrupt change of the tire air pressure of each of the wheels 10–16. Accordingly, the information processing device 72 can obtain the wheel-position information on the basis of the predetermined rule (order of reception of the wheel-side information 50) and the identification data 54 included in the received wheel-side information 50. Thus, the position of each wheel 10–16 newly installed on the vehicle body 8 can be accurately correlated with the identification data 50 identifying the corresponding wheel-side device 20–26.

Thus, the present wheel-state obtaining apparatus permits learning of the wheel positions, namely, registration of the wheel positions and the identification data 54 in relation to each other, immediately after the positions of the wheels 10–18 have been rotated (changed in a predetermined manner). Further, since each wheel-side device 10–16 is arranged to transmit the wheel-side information in response to an abrupt change of the tire air pressure, the present apparatus does not require a triggering device for obtaining the wheel-position information, and is accordingly available at a reduced cost of manufacture. In addition, the apparatus merely requires the operator to simply effect an abrupt change of the tire air pressure of each wheel, without an operation to designate or specify the position of that wheel. Accordingly, the present apparatus permits easy registration of the wheel positions in relation to the identification data 54 identifying the corresponding wheel-side devices. Further, the indicator device 76 informs the operator outside the vehicle, of the status of learning of the positions of the wheels. The operator is also visually informed by the display 74, of the status of learning of the wheel positions.

In the present embodiment, a wheel-position-information obtaining portion operable to obtain the positions of the wheels 10–18 is constituted by a portion of the information processing device 72 which is assigned to execute the wheel-position learning program of FIG. 5.

The learning of the wheels positions in the wheel-position learning mode described above is applicable to the registration of the wheel positions in the wheel-position registering mode. In the wheel-position registering mode, too, step S26 is implemented to determine whether the learning of the positions of the four wheels 10–16 is completed. When the affirmative decision (YES) is obtained in step S26, step S27 is implemented to determine that the wheel-side information the identification data 54 of which has not been registered has been transmitted from the wheel-side device 28 for the spare wheel 18.

In the present embodiment, the operator is informed by the indicator device 76, of the completion of learning of the position of each wheel 10–16. However, this arrangement is not essential. Further, the manner of indication of the tire air pressure on the display 74 is not limited to that described above.

The wheel-side information 50 need not include the air pressure data 56. Where the wheel-side information 50 is transmitted from each wheel-side device 20–28 for the first time in response to an abrupt change of the tire air pressure, as in the wheel-position registering mode, the positions of the wheels can be determined on the basis of the order in which the wheel-side information is received, even in the absence of the air pressure data 56 in the wheel-side information.

While the predetermined rule used in the present embodiment to effect the learning of the wheel positions is the predetermined order in which the tire air pressures of the wheels 10–16 are abruptly changed, the predetermined rule may be a predetermined change of the number of times the tire air pressures of the wheels are abruptly changed. Namely, different numbers of times are assigned to the respective wheels 10–16. For example, the tire air pressure of the front left wheel 10 is abruptly changed only once, the tire air pressure of the front right wheel 12 is abruptly changed twice, and the tire air pressures of the rear wheels 14, 16 are abruptly changed three and four times, respectively. In this case, the information processing device 72 of the body-side device 30 correlate the wheel positions and the identification data 54 (wheel-side devices 20–28) with each other, on the basis of the number of times the wheel-side information 50 representative of the abrupt air pressure change is received. Further, each wheel-side device 20–28 may be arranged to transmit the wheel-side information 50 when its tire air pressure is abruptly increased, as well as when the tire air pressure is abruptly reduced. In this case, the wheel-side information 50 is transmitted twice from each wheel-side device. The predetermined rule may be a rule relating to a combination of the wheel-side information transmitted upon an abrupt reduction of the tire air pressure and the wheel-side information transmitted upon an abrupt increase of the tire air pressure.

Figure 7:
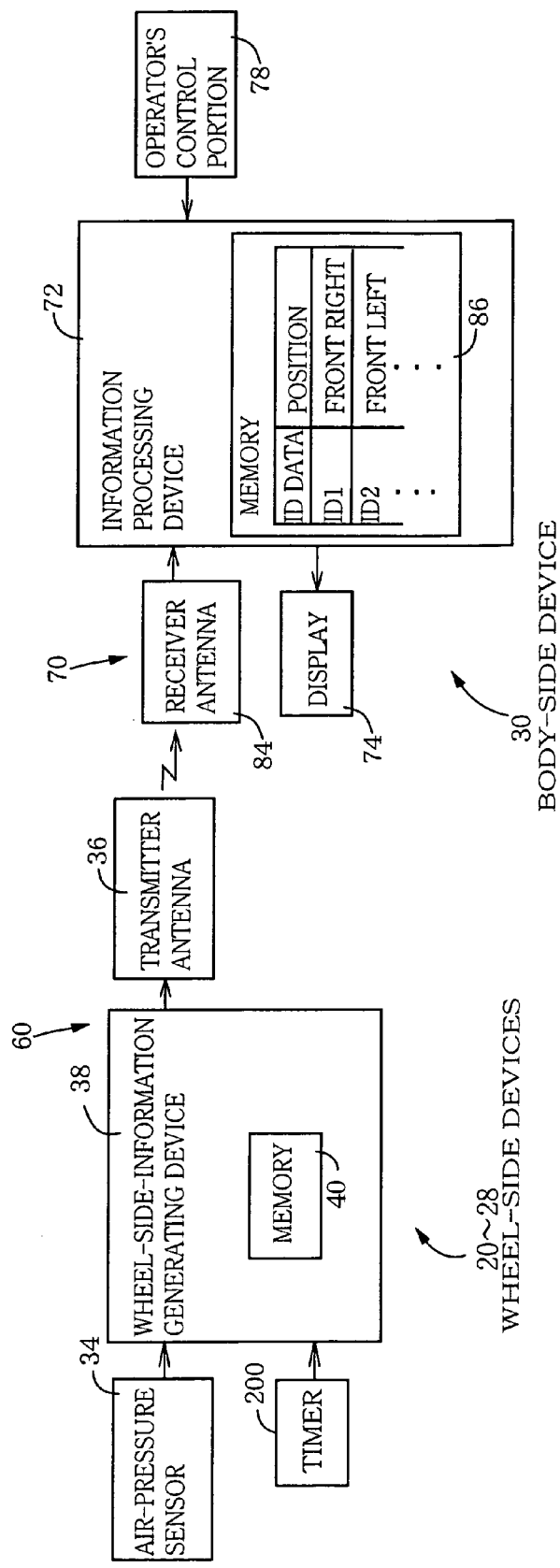
FIG. 7 is a block diagram schematically showing wheel-side devices and a body-side device of a wheel-state obtaining apparatus constructed according to a second embodiment of this invention.
Figure 8:
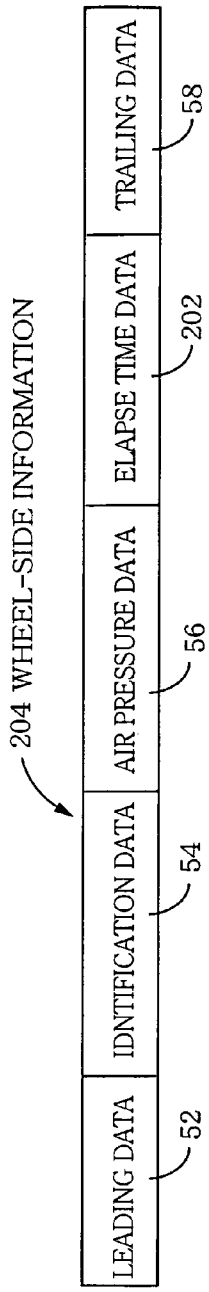
FIG. 8 is a view schematically showing wheel-side information transmitted from each wheel-side device of FIG. 7.
Figure 9:
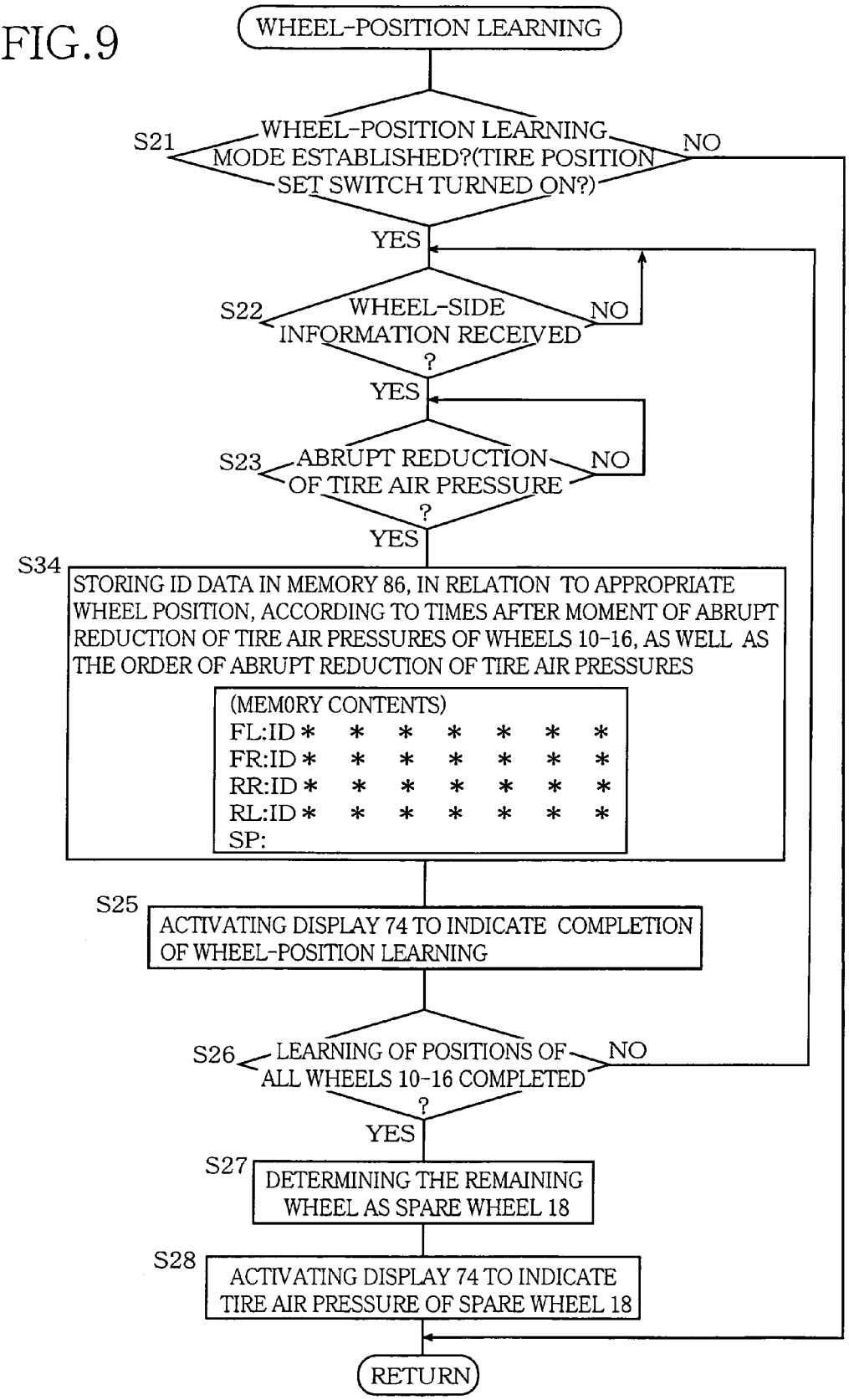
FIG. 9 is a flow chart illustrating a wheel-position learning program stored in a memory portion of an information processing device of the body-side device of FIG. 7.

Referring to FIGS. 7–9, there will be described a wheel-state obtaining apparatus according to a second embodiment of this invention, wherein the wheel-side information transmitted from each wheel-side device 10–18 includes elapse time data representative of a time which has elapsed after the moment at which the tire air pressure was abruptly changed.

In the wheel-state obtaining apparatus according to the second embodiment, the body-side device 30 is not provided with the indicator device 76, while each wheel-side device 10–28 is provided with a timer 200, as shown in FIG. 7. The time 200 is provided to measure a time which has passed or elapsed after the moment of termination of an abrupt change of the tire air pressure by the operator. As previously described, "an abrupt change" of the tire air pressure is defined as an amount change of the tire air pressure more than a predetermined threshold per unit time, or a rate of change of the tire air pressure higher than a predetermined threshold. In the present second embodiment, each wheel-side device 20–26 is arranged to transmit wheel-side information 204, which includes elapse time data 202 representative of the time measured by the timer 200. In this embodiment, the wheel-side information 204 is kept transmitted for a predetermined time (about ten minutes, for example) after the moment of an abrupt reduction of the tire air pressure.

In the second embodiment, the information processing device 72 of the body-side device 30 is arranged to execute a wheel-position learning program illustrated in the flow chart of FIG. 8. In the wheel-position learning program of FIG. 8, step S34 is implemented when the affirmative decision (YES) is obtained in step S23, that is, when the wheel-side information 204 transmitted in response to an abrupt change of the tire air pressure has been received. In step S34, the identification data 54 included in the wheel-side information 204 are stored in the memory 86, in relation to the appropriate wheel position.

Namely, the wheel-side information 204 transmitted from any of the wheel-side devices 20–26 may not be received by the receiver antenna 84 of the body-side device 30 immediately after the moment of its transmission. In this case, the wheel-side information 204 may be received by the body-side device 30 a given time after the moment of the abrupt change of the tire air pressure. In this embodiment, too, the tire air pressures of the wheels 10–16 are abruptly changed by the operator, in the order of the front left wheel 10, front right wheel 12, rear right wheel 16 and rear left wheel 14. Accordingly, the time represented by the elapse time data 202 included in the wheel-side information 204 transmitted from the wheel-side device for the wheel the tire air pressure of which was abruptly changed at a relatively early point of time is longer than the time represented by the elapse time data 202 included in the wheel-side information 204 transmitted from the wheel-side device for the wheel the tire air pressure of which was abruptly changed at a relatively later point of time.

Where the wheel-side information 204 transmitted from two or more of the wheel-side devices 20–26 are received continuously or substantially concurrently by the body-side device 30, the identification data 54 included in these two sets of wheel-side information 204 can be correlated with the positions of the appropriate wheels, according to the elapse times represented by the elapse time data 202 also included in the wheel-side information 204. That is, the wheel-side information 204 including the elapse time data 202 representative of the longest elapse time is determined as the wheel-side information 204 transmitted from the wheel-side device 20 for the front left wheel 10, while the wheel-side information 204 including the elapse time data 202 representative of the shortest elapse time is determined as the wheel-side information 204 transmitted from the wheel-side device 24 for the rear left wheel 14.

Where the wheel-side information 204 transmitted from one of the wheel-side devices 20–26 and the wheel-side information 204 transmitted from another of the wheel-side devices 202-6 are received by the body-side device 30, at different points of time, the identification data 54 may be erroneously correlated with the positions of those two wheels, if the correlation is made according to only the elapse times represented by the elapse time data 202. Where a time interval between the moments of reception of the two sets of wheel-side information 204 is relatively long, the elapse time represented by the elapse time data 202 included in the wheel-side information 204 received at a relatively early point of time may be shorter than the elapse time represented by the elapse time data 202 included in the wheel-side information 204 received at a relatively later point of time. Thus, the times represented by the elapse time data do not necessarily represent the order in which the tire air pressures of the wheels in question were actually abruptly reduced. Namely, the shorter time represented by the elapse time data does not necessarily indicate that the tire air pressure of the wheel corresponding to the wheel-side information including the elapse time data in question was abruptly reduced at the relatively later point of time. In this case, it is necessary to correlate the two sets of identification data 54 of the two wheel-side devices with the positions of the corresponding wheels, on the basis of the time interval between the moments of reception of the two sets of wheel-side information 204, as well as the elapse times represented by the elapse time data 200 included in the respective sets of wheel-side information 204. In other words, it is necessary to convert the times represented by the two sets of elapse time data 202 into hypothetical times between the moments at which the tire air pressures of the corresponding two wheels were abruptly reduced and a hypothetical moment at which the corresponding two sets of wheel-side information 204 are substantially concurrently received by the body-side device. The two sets of identification data 54 included in the respective two sets of wheel-side information 204 can be accurately correlated with the positions of the corresponding wheel, on the basis of the thus obtained hypothetical times.

Where the identification data 54 corresponding to some of the wheels 10–16 have been registered in relation to the respective positions of these wheels, according to the wheel-side information 204 transmitted as a result of the abrupt reduction of the tire air pressures of those wheels, while the identification data 54 corresponding to the other of the wheels 10–16 have not been registered, that is, where the learning of the positions of some of the wheels 10–16 has been completed, but the learning of the positions of the other of the wheels 10–16 is not completed, the learning of the other wheel or wheels can be made by comparing the corresponding elapse time or times with the elapse times of the wheels the positions of which have already been registered. If the learning of the position of the front right wheel 12 is completed but the learning of the position of the front left wheel 10 is not completed, the wheel-side information 204 including the elapse time data 202 representative of an elapse time longer than that represented by the elapse time data 202 included in the wheel-side information 204 received from the wheel-side device 22 can be determined as the wheel-side information 204 received from the wheel-side device 20 for the front left wheel 10.

In the present second embodiment, it is preferable to store the received wheel-side information 204 in the memory 86.

When the learning of the position of each wheel is completed, step S25 is implemented to active the display 74 to inform the operator of the completion of learning. Thus, the positions of all of the four wheels 10–16 are correlated with the identification data 54 identifying the respective wheel-side devices 20–26, and the affirmative decision (YES) is obtained in step S26, so that the control flow goes to steps S27 and S28 to correlate the identification data 54 of the spare wheel 18 with the position of this spare wheel, and activate the display 74 to indicate the tire air pressure of the spare wheel 18.

As in the first embodiment, the body-side device 30 is placed in the wheel-state obtaining mode, and the operator adjusts the tire air pressures of the wheels 10–16 to the optimum value.

Thus, the second embodiment permits learning of the positions of the wheels 10–19, on the basis of the times after the moments of the abrupt reduction of the tire air pressures, even if the wheel-side information transmitted from each wheel-side device 20–26 is not immediately received by the body-side device 30 but is received some time after the moment of the abrupt reduction of the tire air pressure. The present embodiment assures increased accuracy of learning of the wheel positions, and permits verification of the accuracy of the learning of the wheel positions on the basis of the elapse time data 202.

The wheel-state obtaining apparatus according to the present second embodiment may be modified such that the body-side device 30 transmits a wheel-side-information request signal, in response to which each wheel-side device 20–28 transmits the wheel-side information 204. This modification permits the body-side device 30 to successively one after another or substantially concurrently receive the sets of wheel-side information 204 from all of the four wheel-side devices 20–26, so that the body-side device 30 can correlate the identification data 54 of the wheels 10–16 with the respective positions of the wheels 10–16, on the basis of the elapse times included in the received wheel-side information 204, without having to take into account of the time interval between the moments of reception of the individual sets of wheel-side information 204. In this case, the wheel-side information 204 not including the elapse time data 202 is determined to be the wheel-side information 204 transmitted from the wheel-side device 28 for the spare wheel 18.

Each wheel-side device 20–28 may be modified to transmit the wheel-side information at different time intervals in the wheel-position learning mode (during the predetermined length of time after the moment of the abrupt reduction of the tire air pressure) and in the wheel-state obtaining mode (after the predetermined length of time has passed). That is, it is desirable that the wheel-side information is transmitted in the wheel-position learning mode at a time interval shorter than that in the wheel-state obtaining mode, so that the time required to complete the learning of the wheel positions in the wheel-position learning mode can be shortened.

Figure 10A:
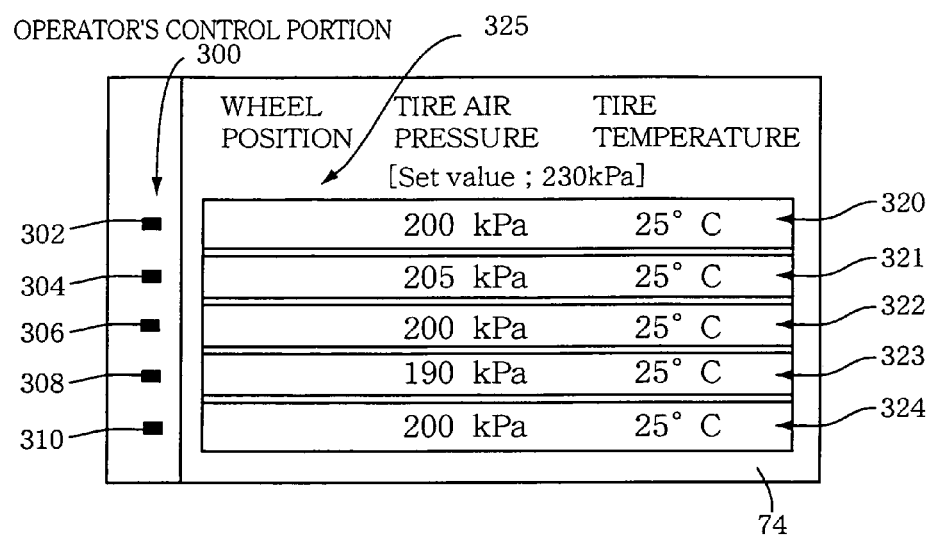
FIGS. 10A and 10B are views showing a display and an adjacent operator's control portion of an information processing device of a body-side device of a wheel-state obtaining apparatus according to a third embodiment of this invention.
Figure 10B:
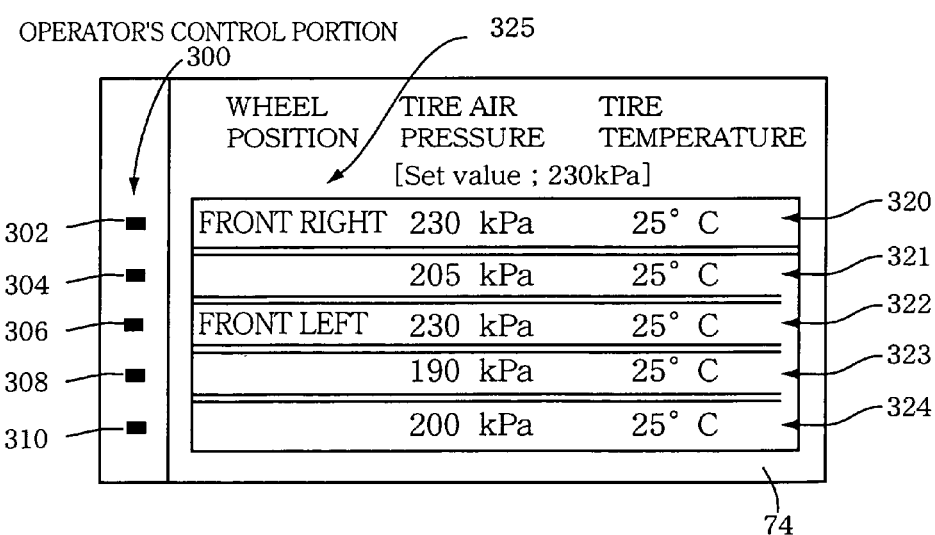

The identification data identifying the respective wheels 10–18 (wheel-side devices 20–28) can be correlated with the positions of the respective wheels 19–18, in a manual mode by the operator, as in a wheel-state obtaining apparatus according to the third embodiment of this invention, wherein the body-side device 30 is provided with an input portion in the form of an operator's control portion 300 located adjacent to the display 74, as shown in FIGS. 10A and 10B. The operator's control portion 300 is provided with pushbuttons 302, 304, 306, 308 and 310 corresponding to the respective five wheels 10–18 (corresponding to the respective sets of identification data 54). The body-side device 30 is further provided with another operator's control portion (not shown), which is used to establish the wheel-position learning mode. When the operator operates this operator's control portion after positional rotation of the wheels 10–18, the display 74 functioning as a wheel-state indicator portion provides views 320–324 corresponding to the respective wheels 10–18, according to the wheel-side information received from the wheel-side devices 20–28. Each of the views 320–324 includes an indication of the tire air pressure and temperature of the corresponding wheel after the positional rotation of the wheels 10–18. However, each view 320–324 does not include an indication of the position of the corresponding wheel. Namely, each of the views 320–324 is blank at its indicator portion 325 assigned to the indication of the wheel position.

In the present third embodiment, the operator increases the tire air pressures of the wheels 10–16 in the order of the front left wheel 10, front right wheel 12, rear right wheel 16 and rear left wheel 14, to correlate the identification data 54 with the position of each wheel 10–18 after the positional rotation of the wheels 10–18. It is noted that the tire air pressures of the wheels 10–18 tend to be lower than required, when the positional rotation of the wheels is effected. In this respect, it is desirable that the wheel-side devices 20–26 transmit the wheel-side information in response to an increase of the tire air pressure of the corresponding wheels 10–16.

If the tire air pressure indicated in the third view 322 is increased as a result of an increase of the tire air pressure of the front left wheel 10 by the operator, for example, the tire air pressure indicated in the third view 322 is determined as the tire air pressure of the front left wheel 10. In this case, therefore, the operator presses the third pushbutton 306 only once, to select the front left position. Thus, the identification data 54 included in the wheel-side information received from the wheel-side device corresponding to the third view 322 are stored in the memory 86, in relation to the front left wheel 10, and the portion 325 of the third view 322 of the display 74 provides an indication of the front left position ("FRONT LEFT").

Each of the pushbuttons 302–310 is arranged such that each time the pushbutton is pressed, the wheel position is changed. That is, the wheel position is changed in the order of the front left position, front right position, rear right position and rear left position, each time the pushbutton is pressed, that is, as the number of pressing actions of the pushbutton increases. Thus, the wheel position to be indicated at the portion 325 of each of the views 320–324 is selected by pressing the corresponding pushbutton 302–310 the selected number of times. When the pushbutton is held in the non-pressed state for more than a predetermined first time, the position of the wheel is fixed at the currently selected position. That is, the currently selected position is finally designated as the position of the wheel. If the pushbutton is held in the pressed state for more than a predetermined second time shorter than the first time, the currently selected wheel position is cancelled or invalidated.

If the tire air pressure indicated in the first view 320 is increased as a result of an increase of the tire air pressure of the front right wheel 12 by the operator, the tire air pressure indicated in the first view 320 is determined as the tire air pressure of the front right wheel 12. In this case, therefore, the operator presses the first pushbutton 302 twice, to select the front right position. Thus, the identification data 54 included in the wheel-side information received from the wheel-side device corresponding to the first view 320 are stored in the memory 86, in relation to the front right wheel 12, and the portion 325 of the first view 320 of the display 74 provides an indication of the front right position ("FRONT RIGHT").

Figure 11:
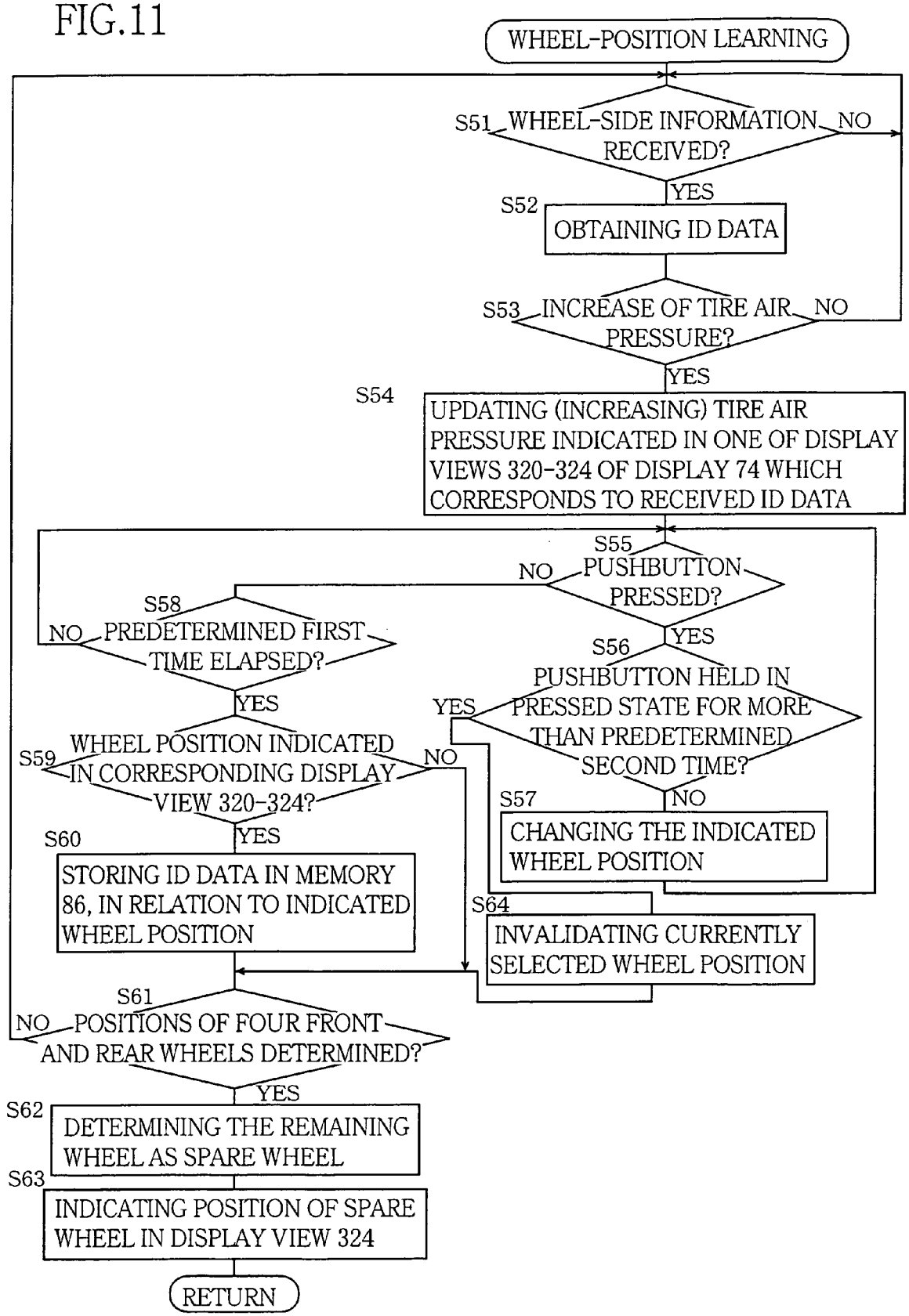
FIG. 11 is a flow chart illustrating a wheel-position learning program stored in a memory portion of the information processing device of FIG. 7.

In the third embodiment, the information processing device 72 of the body-side device 30 executes a wheel-position learning program illustrated in the flow chart of FIG. 11, with a predetermined cycle time.

The program of FIG. 11 is initiated with step S51 to determine whether the wheel-side information transmitted from any wheel-side device has been received by the receiver antenna 84. If an affirmative decision (YES) is obtained in step S51, the control flow goes to step S52 to obtain the identification data 54 included in the received wheel-side information. Step S53 is followed by step S54 to determine whether the tire air pressure represented by the air pressure data 56 included in the received wheel-side information is higher than the tire air pressure stored in the memory 86 in relation to the wheel position represented by the obtained identification data 54. If an affirmative decision (YES) is obtained in step S53, the control flow goes to step S54 to update, that is, increase the tire air pressure stored in the memory 86 in relation to the wheel position represented by the identification data 54 included in the received wheel-side information, and to similarly update the tire air pressure indicated in the corresponding one of the views 320–324.

For easier and quick recognition by the operator that the tire air pressure indicated on the display 74 has been updated (increased), it is desirable to arrange the display 74 such that the updated tire air pressure is indicated in the appropriate one of the view 320–324, in a color different from the color of indication of the tire air pressures in the other views 320–324, or in a flickering fashion.

In the above-described arrangement, the display 74 indicates an increase in the tire air pressure of the wheel corresponding to the wheel-side device from which the body-side device 30 has received the wheel-side information including the air pressure data 54 which indicates the increased tire air pressure. Where the air pressure data 54 included in the received wheel-side information do not indicate an increase in the tire air pressure, for example, where the air pressure data 54 included in the received wheel-side information remain unchanged because the received wheel-side information has been transmitted from the wheel-side device from which the wheel-side information had already been received after the increase of the tire air pressure of the corresponding wheel, the tire air pressure in question indicated on the display 74 remains unchanged, without a color change or flickering of the indication of the tire air pressure. This arrangement prevents an erroneous designation or selection of the wheel position by the operator with the pushbuttons 302–310.

Step S54 is followed by step S55 to determine whether one of the pushbuttons 302–310 which corresponds to the identification data 54 included in the received wheel-side information has been pressed. Where the pushbutton 306 has been pressed after the tire air pressure indicated in the third view 322 was increased in step S54, for example, an affirmative decision (YES) is obtained in step S55, and the control flow goes to step S56 to determine whether the pushbutton 306 has been held in the pressed state for more than the predetermined second time. If a negative decision (NO) is obtained in step S56, that is, if the pushbutton 306 is pressed twice in a time shorter than the predetermined second time, the control flow goes to step S57 in which the wheel position indicated in the portion 325 of the third view 322 is changed one step from the currently indicated position to the next, in the order of the front left, front right, rear right and rear left, as described above.

If the pushbutton 306 has not been pressed, that is, if a negative decision (NO) is obtained in step S55, the control flow goes to step S58 to determine whether the predetermined first time has elapsed. If an affirmative decision (YES) is obtained in step S58, it is considered that the operator does not have an intention to press the pushbutton 506 any more time. In this case, the control flow goes to step S59 to determine whether any wheel position is currently indicated in the third view 322, that is, whether the pushbutton 306 has been pressed at least once to designate the wheel position. If an affirmative decision (YES) is obtained in step S59, the control flow goes to step S60 in which the currently indicated wheel position is stored in the memory 86, in relation to the identification data 54 included in the wheel-side information received in step S52. Step S60 is followed by step S61 to determine whether the positions of the four front and rear wheels 10–16 have been stored in the memory 86, in relation to the respective sets of identification data 54 included in the four sets of wheel-side information received from the respective wheel-side devices 20–26. If an affirmative decision (NO) is obtained in step S61, the control flow goes back to step S51, to initiate the next cycle of execution of the wheel-position learning program.

If an affirmative decision (YES) is obtained in step S61, the control flow goes to step S62 to determine the remaining wheel as the spare wheel 18, and to step S63 to store the position of the spare wheel 18 in the memory 86, in relation to the identification data 54 identifying the spare wheel 18, and active the display 74 to indicate the position of the spare wheel 18 in the fifth view 324.

If the pushbutton is held in the pressed state for more than the predetermined second time, that is, if an affirmative decision (YES) is obtained in step S56, the control flow goes to step S64 to invalidate the wheel position currently selected by the pressing operation of the pushbutton. In this case, any wheel position is stored in the memory 86.

If the predetermined first time has elapsed without a pressing operation of any one of the pushbuttons 302–310, a negative decision (NO) is obtained in step S59, and the control flow goes to step S61. In this case, no wheel position is determined for the received wheel-side information.

If an increase of the tire air pressure represented by the air pressure data 54 included in the received wheel-side information, a negative decision (NO) is obtained in step S53, and the control flow goes back to step S51, without implementing step S54 and the following steps. Thus, the processing operation by the information processing device 72 depending upon the pressing operations of the pushbuttons 302–310 is performed only when the air pressure data 54 in the received wheel-side information indicate an increase of the tire air pressure. Accordingly, this arrangement is effective to prevent erroneous designation of the wheel positions due to an operation of the pushbuttons 320–324 before detection of an increase of the tire air pressure.

As described above, the wheel-state obtaining apparatus according to the third embodiment permits the operator to designate the wheel positions, with high degree of accuracy and reliability, by operating the pushbuttons 302–310 while observing the indications in the display views 320–324 provided on the display 74, more specifically, while observing the views 320–324 for detection of an increase of the tire air pressure indicated in any one of the views 320–324. Further, the operator increases the tire air pressures of the wheels 10–16 in the predetermined order, and the positions of the wheels can be accurately designated by operations of the pushbuttons 302–310, in the order of increase of the tire air pressures.

Preferably, the numbers of pressing operations of the pushbuttons 302–310 to designate the wheel positions are determined according to the order of the wheels 10–16 the tire air pressures of which are increased by the operator, so that the number of the pressing operations of the pushbuttons is incremented or increased each time the wheel the tire air pressure of which is increased is changed from one wheel to another. This determination of the numbers of the pressing operations of the pushbuttons assures high accuracy of designation or learning of the wheel positions 10–18 in relation to the respective wheel-side devices 20–28.

In the present third embodiment, a wheel-position-information memory portion for storing wheel-position information indicative of the position of each wheel is constituted by the memory 86 of the information processing device 72, and a wheel-position-information-memory control portion operable to control the wheel-position-information memory portion is constituted by a portion of the information processing device 72 which is assigned by step S60 of the wheel-position learning program of the flow chart of FIG. 11.

In the third embodiment, the tire air pressures of the wheels 10–16 need not be changed according to a predetermined rule. Even where the tire air pressures of the wheels 10–16 are changed in an order determined by the operator, the operator knows the position of the wheel the tire air pressure of which has been changed, so that the operator who has observed a change of the tire air pressure indicated on the display 72 can designate the position of that wheel by operating the corresponding one of the pushbuttons 302–310.

Further, the detection of an increase of the tire air pressure in step S53 is not essential, and a change of a manner of indication of the tire air pressure in step S54 upon detection of a change of the tire air pressure is not essential. That is, the body-side device 30 need not be arranged to detect an increase of the tire air pressure, since the operator can recognize a change of the tire air pressure represented by the air pressure data 54 included in the received wheel-side information, by observing the indication of the tire air pressures in the corresponding one of the display views 320–324 of the display 74, so that the operator can designate the position of the corresponding wheel by operating the corresponding one of the pushbuttons 302–310.

Figure 12:
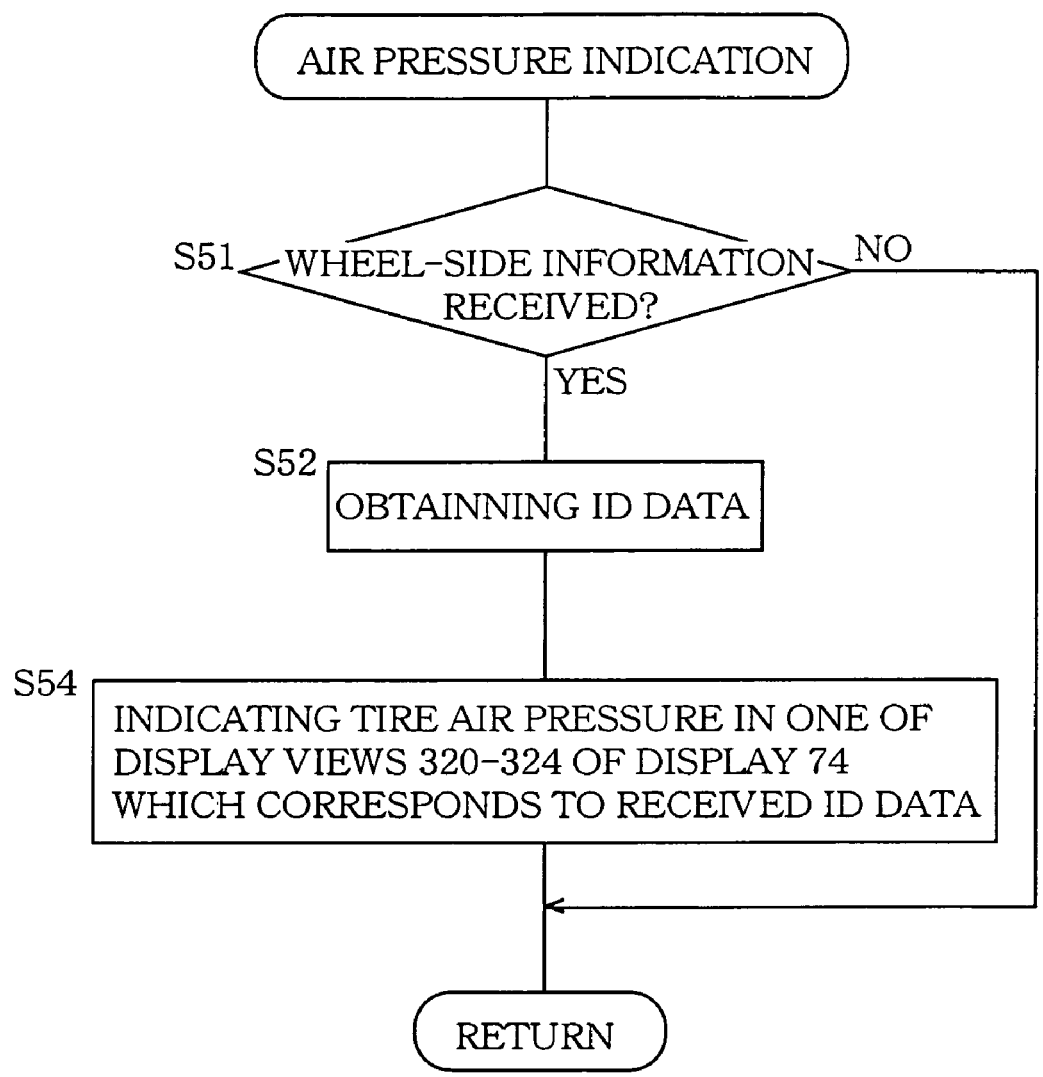
FIG. 12 is a flow chart illustrating an air-pressure indicating program stored in a memory portion of an information processing device of a body-side device of a wheel-state obtaining apparatus according to a fourth embodiment of the invention.
Figure 13:
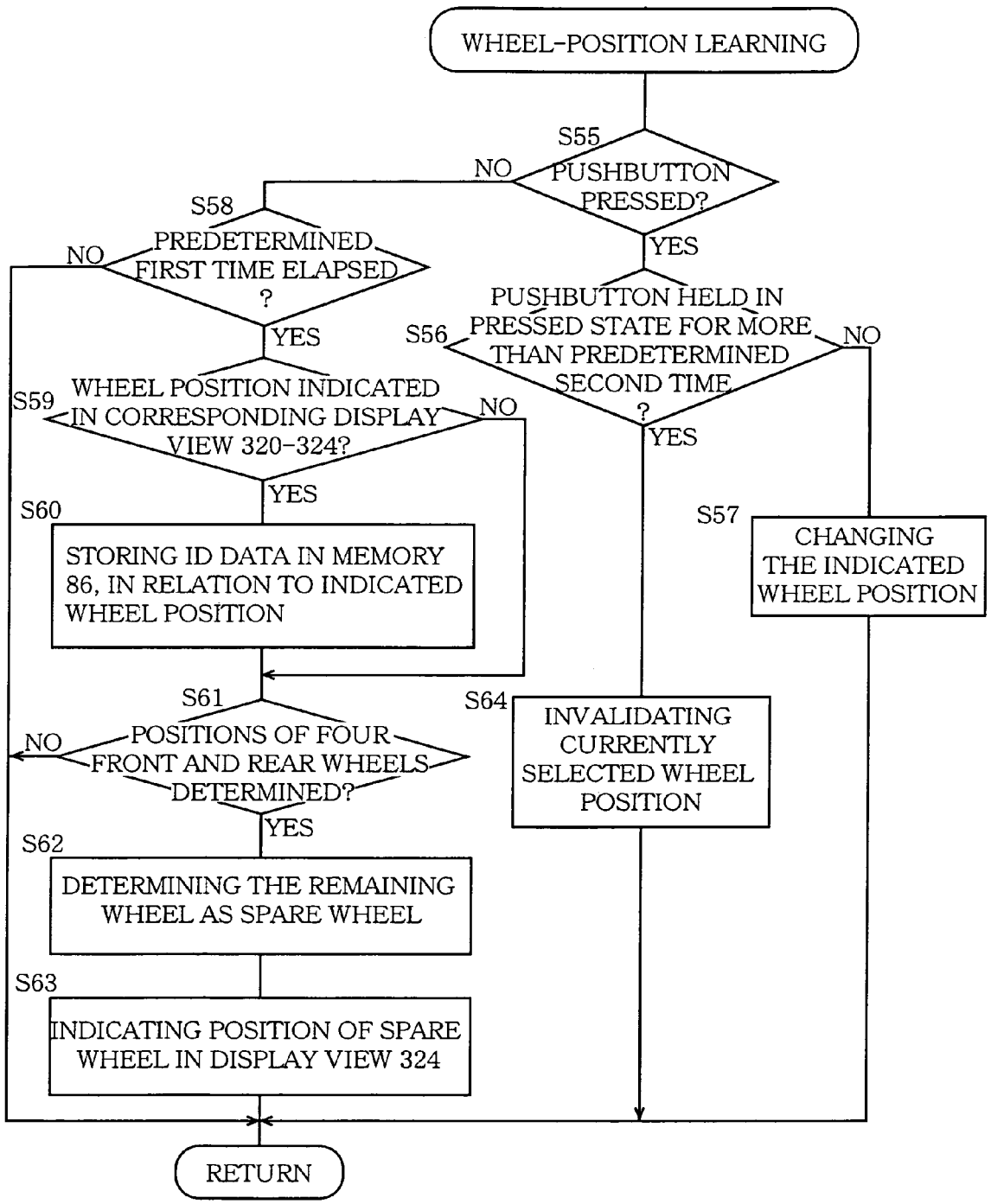
FIG. 13 is a flow chart illustrating a wheel-position storing program stored in the memory portion of the information processing device in the fourth embodiment.

In this fourth embodiment, the information processing device 72 is arranged to execute an air-pressure indication program illustrated in the flow chart of FIG. 12, to control the display 74, and a wheel-position learning program which does not include steps S51–54 and which is illustrated in the flow chart of FIG. 13. The air-pressure indication program of FIG. 12 is executed with a predetermined cycle time while the body-side device 30 is placed in the wheel-position learning mode and the wheel-state obtaining mode. This program is initiated with step S51 to determine whether the wheel-side information transmitted from any wheel-side device has been received. If an affirmative decision (YES) is obtained in step S51, the control flow goes to step S52 to obtain the identification data 54 included in the received wheel-side information, and to step S54 to activate the display 74 to indicate the tire air pressure in one of the display views 320–324 which corresponds to the obtained identification data 54. In step S54, the tire air pressure represented by the air pressure data 54 included in the received wheel-side information is indicated on the display 74, irrespective of whether the air pressure has been changed or not.

The wheel-position learning program of FIG. 13 is executed with a predetermined cycle time while the body-side device 30 is placed in the wheel-position learning mode. This program is initiated with step S55 to determine whether the pushbutton corresponding to the identification data 54 obtained in step S53 has been pressed. Steps S55, S58, S59 and S61 are repeatedly implemented until the pushbutton has been pressed.

The operator need not observe the display 74, to designate the position of the wheel the tire air pressure has been changed. That is, the information processing device 72 of the body-side device 30 may be arranged to correlate the identification data 54 of the received wheel-side information with the wheel position, on the basis of the tire air pressure represented by the air pressure data 56 of the received wheel-side information and a predetermined rule relating to an increase of the tire air pressure of each wheel. The predetermined rule may be such that the tire air pressures of the front and rear four wheels 10–16 are changed to respective different values, or at respective different rates.

In the illustrated embodiments described above, the wheel-side information is transmitted from each wheel-side device 20–26 as a result of a change of the tire air pressure of the corresponding wheel, namely, in response to a trigger signal in the form of a change of the tire air pressure. However, an abrupt change of the tire temperature may be used as a trigger signal. In this modified arrangement, the state (i.e., tire air pressure) of the wheel which is detected by a sensor (air-pressure sensor 34) and which is transmitted to the body-side device 30 is different from the wheel state (i.e., tire temperature) a change of which is used as the trigger signal.

The pushbuttons 302–310 used to designate the wheel positions may be replaced by other types of manually operable members. The manually operable members such as the pushbuttons need not be provided for the respective views 320–324 of the display 74. For instance, a single pushbutton is provided to select one of the display views 302–310, and another pushbutton is provided to designate the wheel position corresponding to the selected display view. Alternatively, a keyboard may be provided to directly designate the wheel positions.

While the illustrated embodiments are arranged to store the identification data 54 of the wheel-side devices 20–28 in the memory 86, in relation to the wheel positions, after the positions of the wheels 10–18 are changed by the positional rotation, the principle of the present invention is equally applicable to the initial registering of the identification data 54 in relation to the wheel positions, and the inspection or verification of the registered relationship between the identification data 54 and the wheel positions.

In the illustrated embodiments, the tire air pressures of the wheels 10–16 are manually changed by the operator. However, the tire air pressures may be automatically changed by an air pressure adjusting device or devices, without a manual operation by the operator. The air pressure adjusting device or devices may or may not be installed on the vehicle.

The wheel-side devices 20–28 each including the transmitter antenna 36, and the wheel-side-information receiving device 70 of the body-side device 30 which includes the receiver antenna 84 may be arranged to be able to both transmit and receive information.

It is to be understood that the present invention may be embodied with various other changes and improvements, such as those described above in the SUMMARY OF THE INVENTION, which may occur to those skilled in the art.

What is claimed is:

1. A wheel-state obtaining apparatus comprising (i) a plurality of wheel-side devices which are provided on respective wheels of a vehicle and each of which includes (a) a wheel-state sensor operable to detect a state of a corresponding one of the wheels, and (b) a wheel-side-information transmitting portion operable to transmit, by radio communication, wheel-side information including wheel-state data indicative of the state of said corresponding wheel and identification data identifying said each wheel-side device, and (ii) a body-side device provided on a body of the vehicle and including (c) at least one wheel-side-information receiving device operable to receive the wheel-side information transmitted from each of said plurality of wheel-side devices, and (d) an information processing device operable to process the wheel-side information received by said at least one wheel-side-information receiving device, wherein an improvement comprises:

said information processing device including a wheel-position-information obtaining portion operable to obtain wheel-position information indicative of a position of each of the wheels relative to said body, on the basis of the states of said plurality of wheels which are changed according to a predetermined rule.

2. The wheel-state obtaining apparatus according to claim 1, wherein said wheel-state sensor is an air-pressure sensor operable to detect a tire air pressure of said corresponding wheel.

3. The wheel-state obtaining apparatus according to claim 1, wherein said wheel-side-information transmitting portion is operable to transmit said wheel-side information, in response to a change of the state of said corresponding wheel to an extent exceeding a predetermined threshold, and said wheel-position-information obtaining portion is operable to obtain said wheel-position information on the basis of a state of reception of said wheel-side information by said at least one wheel-side-information receiving device, as well as said predetermined rule according to which the states of said plurality of wheels are changed to said extent.

4. The wheel-state obtaining apparatus according to claim 1, wherein said predetermined rule includes a predetermined order in which the states of said plurality of wheels are changed.

5. The wheel-state obtaining apparatus according to claim 1, wherein said predetermined rule includes different patterns in which the states of said plurality of wheels are changed, respectively.

6. The wheel-state obtaining apparatus according to claim 1, wherein said body-side device further includes an indicator device operable to inform that said wheel-position-information obtaining portion has obtained said wheel-position information for each of said plurality of wheels.

7. The wheel-state obtaining apparatus according to claim 1, wherein said information processing device of said body-side device includes a memory portion operable to store said identification data and said wheel-position information of each of said plurality wheels in relation to each other.

8. The wheel-state obtaining apparatus according to claim 1, wherein said information processing device of said body-side device includes a display operable to provide a view indicating a process of a wheel-position learning operation of said wheel-position-information obtaining portion to obtain said wheel-position information for each of said plurality of wheels.

9. The wheel-state obtaining apparatus according to claim 1, wherein said body-side device further includes a wheel-state changing device operable to change the states of said plurality of wheels according to said predetermined rule.

10. The wheel-state obtaining apparatus according to claim 1, wherein said predetermined rule includes a predetermined order in which the states of said plurality of wheels are changed, and said wheel-side-information transmitting portion of each of said plurality of wheel-side devices is operable to transmit said wheel-side information, in response to a change of the state of said corresponding wheel, said wheel-position-information obtaining portion being operable to obtain said wheel-position information on the basis of said predetermined order and an order of reception of said wheel-side information by said at least one wheel-side-information receiving device from said plurality of wheel-side devices.

11. The wheel-state obtaining apparatus according to claim 1, wherein said predetermined rule includes a predetermined order in which the states of said plurality of wheels are changed, and each of said plurality of wheel-side devices further includes a timer operable to measure a time after a moment of termination of a change of the state of said corresponding wheel to an extent exceeding a predetermined threshold within a predetermined time duration, said wheel-side information further including elapse time data representative of said time after said moment of termination, said wheel-position-information obtaining portion being operable to obtain said wheel-position information on the basis of said elapse time data, as well as said predetermined order.

12. The wheel-state obtaining apparatus according to claim 11, wherein said wheel-position-information obtaining portion includes a converter operable when said at least one wheel-side-information receiving device receives from said plurality of wheel-side devices respective sets of wheel-side information at respective different points of times, said converter converting the times represented by sets of elapse time data included in the respective sets of wheel-side information, into hypothetical times between the moments at which the states of said plurality of wheels are changed and a hypothetical moment at which said sets of wheel-side information are substantially concurrently received by said at least one wheel-side-information receiving device, said wheel-position-information obtaining portion being operable to obtain said wheel-position information on the basis of said hypothetical times, as well as said predetermined order.

13. The wheel-state obtaining apparatus according to claim 11, wherein said wheel-side-information transmitting portion includes at least one of (i) a first transmitting portion operable to transmit said wheel-side information in response to the change of the state of said corresponding wheel to said extent within said predetermined time duration, and at a predetermined time interval thereafter, and (ii) a second transmitting portion operable to transmit said wheel-side information in response to a request signal which is received from said body-side device and which requests the wheel-side-information transmitting portion to transmit said wheel-side information.

14. The wheel-state obtaining apparatus according to claim 1, wherein said body-side device further includes (e) a wheel-state indicator portion operable to indicate said wheel-state data included in said wheel-side information received by said at least one wheel-side-information receiving portion, (t) an input portion manually operable to input said wheel-position information, (g) a wheel-position-information memory portion for storing said wheel-position information input through said input portion, and (h) a wheel-position-information-memory control portion operable to store said wheel-position information in said wheel-position-information memory portion, wherein said wheel-position- information-memory control portion is operable when said wheel-position information has been input through said input portion after the state of said corresponding wheel indicated by said wheel-state indicator portion is changed, said wheel-position-information-memory control portion storing, in said wheel-position-information memory portion, said identification data identifying the wheel-side device which has transmitted the wheel-side information including said wheel-state data which indicates a change of the state of said corresponding wheel, and said wheel-position information input through said input portion, such that said identification data and said wheel-position information are stored in said wheel-position-information memory portion, in relation to each other.

15. The wheel-state obtaining apparatus according to claim 14, wherein said input portion includes an operator's control section provided with at least one manually operable member.

16. The wheel-state obtaining apparatus according to claim 14, wherein said wheel-state indicator portion includes a display operable to display said wheel-state data.

17. The wheel-state obtaining apparatus according to claim 16, wherein said input portion includes a plurality of manually operable devices respectively corresponding to said plurality of wheel-side devices, and said display includes a plurality of display portions which respectively correspond to said plurality of manually operable devices and respective correspond to said plurality of wheel-side devices.

18. The wheel-state obtaining apparatus according to claim 14, wherein said body-side device includes a wheel-state-change detecting portion operable to detect a change of the state of each wheel indicated by the wheel-state data included in the wheel-side information transmitted from a corresponding one of said plurality of wheel-side devices.

19. The wheel-state obtaining apparatus according to claim 1, wherein said wheel-position-information obtaining portion is operable to obtain said wheel-position information of each of said plurality of wheels, on the basis of said wheel-state data included in said wheel-side information received by said at least one wheel-side-information receiving device, as well as said predetermined rule according to which the states of said plurality of wheels are changed.

20. The wheel-state obtaining apparatus according to claim 1, wherein said plurality of wheel-side devices consist of a plurality of first wheel-side devices provided on respective installed wheels installed on said body, and at least one second wheel-side device provided on at least one spare wheel, and said body-side device further includes an identification-data memory portion for storing said identification data identifying each of said plurality of wheel-side devices, said wheel-position obtaining portion including an identification-data specifying portion operable to specify, on the basis of said wheel-side information received by said at least one wheel-side-information receiving device, said identification data identifying the wheel-side device provided on each of said at least one spare wheel, when the states of said installed wheels are changed according to said predetermined rule while the state of said at least one spare wheel is kept unchanged, after the positions of at least two of said plurality of wheels consisting of said installed wheels and said at least one spare wheel are changed for positional rotation of said plurality of wheels.

21. A wheel-state obtaining apparatus comprising (i) a plurality of wheel-side devices which are provided on respective wheels of a vehicle and each of which includes (a) a wheel-state sensor operable to detect a state of a corresponding one of the wheels, and (b) a wheel-side-information transmitting portion operable to transmit, by radio communication, wheel-side information including wheel-state data indicative of the state of said corresponding wheel and identification data identifying said each wheel-side device, and (ii) a body-side device provided on a body of the vehicle and including (c) at least one wheel-side-information receiving device operable to receive the wheel-side information transmitted from each of said plurality of wheel-side devices, (d) an information processing device operable to process the wheel-side information received by said at least one wheel-side-information receiving device, (e) a wheel-state indicator portion operable to indicate said wheel-state data included in said wheel-side information received by said at least one wheel-side-information receiving portion, (f) an input portion manually operable to input wheel-position information indicative of a position of each of the wheels relative to the body, (g) a wheel-position-information memory portion for storing said wheel-position information input through said input portion, and (h) a wheel-position-information-memory control portion operable to store said wheel-position information in said wheel-position-information memory portion, wherein an improvement comprises:

said wheel-position-information-memory control portion being operable when said wheel-position information has been input through said input portion after the state of said corresponding wheel indicated by said wheel-state indicator portion is changed, said wheel-position-information-memory control portion storing, in said wheel-position-information memory portion, said identification data identifying the wheel-side device which has transmitted the wheel-side information including said wheel-state data which indicates a change of the state of said corresponding wheel, and said wheel-position information input through said input portion, such that said identification data and said wheel-position information are stored in said wheel-position-information memory portion, in relation to each other.

22. A method of obtaining wheel-position information indicative of a position of each of a plurality of wheels of a vehicle relative to a body of the vehicle, with a wheel-state obtaining apparatus comprising (i) a plurality of wheel-side devices which are provided on said plurality of wheels, respectively and each of which includes (a) a wheel-state sensor operable to detect a first state of a corresponding one of the wheels, and (b) a wheel-side-information transmitting portion operable to transmit, by radio communication, wheel-side information including at least one of first-wheel-state data indicative of said first state of said corresponding wheel and identification data identifying said each wheel-side device, in response to a change of a second state of said corresponding wheel to an extent exceeding a predetermined threshold, and (ii) a body-side device provided on said body of the vehicle and including (c) at least one wheel-side-information receiving device operable to receive the wheel-side information transmitted from each of said plurality of wheel-side devices, and (d) an information processing device operable to process the wheel-side information received by said at least one wheel-side-information receiving device, said method comprising:
    changing the second states of said plurality of wheels to said extent according to a predetermined rule, and obtaining said wheel-position information of each of said plurality of wheels, on the basis of said predetermined order and a state of reception by said at least one wheel-side-information receiving device of the wheel-side information transmitted from a corresponding one of said plurality of wheel-side devices.

23. The method according to claim 22, wherein the second states of said plurality of wheels are changed to said extent in a predetermined order, and said wheel-side information of each of said plurality of wheels is obtained on the basis of said predetermined order and an order in which sets of said wheel-side information transmitted from said plurality of wheel-side devices, respectively, have been actually received by said at least one wheel-side-information receiving device.

24. The method according to claim 23, wherein each of said plurality of wheel-side devices further includes a timer operable to measure a time after a moment of termination of a change of the second state of said corresponding wheel to said extent within a predetermined time duration, and said wheel-side information further includes elapse time data representative of said time after said moment of termination, said wheel-position information being obtained on the basis of said elapse time data, as well as said predetermined order.

25. A method of obtaining wheel-position information indicative of a position of each of a plurality of wheels of a vehicle relative to a body of the vehicle, with a wheel-state obtaining apparatus comprising (i) a plurality of wheel-side devices which are provided on said plurality of wheels, respectively and each of which includes (a) a wheel-state sensor operable to detect a state of a corresponding one of the wheels, and (b) a wheel-side-information transmitting portion operable to transmit, by radio communication, wheel-side information including wheel-state data indicative of said state of said corresponding wheel and identification data identifying said each wheel-side device, and (ii) a body-side device provided on said body of the vehicle and including (c) at least one wheel-side-information receiving device operable to receive the wheel-side information transmitted from each of said plurality of wheel-side devices, (d) an information processing device operable to process the wheel-side information received by said at least one wheel-side-information receiving device, (e) a wheel-state indicator portion operable to indicate said wheel-state data included in said wheel-side information received by said at least one wheel-side-information receiving portion, (f) an input portion manually operable to input wheel-position information indicative of a position of each of the wheels relative to the body, (g) a wheel-position-information memory portion for storing said wheel-position information input through said input portion, and (h) a wheel-position-information-memory control portion operable to store said wheel-position information in said wheel-position-information memory portion, the method comprising:
    sequentially changing the states of said plurality of wheels each of which is detected by said wheel-state sensor;
    inputting said wheel-position information through said input portion after confirming that the state of said each wheel indicated by said wheel-state indicator portion has been changed; and
    storing, in said wheel-position-information memory portion, said identification data identifying the wheel-side device which has transmitted the wheel-side information including said wheel-state data which indicates a change of the state of said corresponding wheel, and said wheel-position information input through said input portion, such that said identification data and said wheel-position information are stored in said wheel-position-information memory portion, in relation to each other.

* * * * *